US012728838B2

(12) United States Patent
Park et al.

(10) Patent No.: US 12,728,838 B2
(45) Date of Patent: Sep. 8, 2026

(54) PARKING AREA DETECTION

(71) Applicant: NVIDIA Corporation, Santa Clara, CA (US)

(72) Inventors: Minwoo Park, Saratoga, CA (US); Gang Pan, Fremont, CA (US); Ayon Sen, Santa Clara, CA (US); Hsin Miao, San Francisco, CA (US); Dongran Liu, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/895,025

(22) Filed: Sep. 24, 2024

(65) Prior Publication Data

US 2026/0084692 A1 Mar. 26, 2026

(51) Int. Cl.

| | |
|---|---|
| ***G08G 1/14*** | (2006.01) |
| ***B60W 30/06*** | (2006.01) |
| ***G06T 7/13*** | (2017.01) |
| ***G06V 10/44*** | (2022.01) |
| ***G06V 10/75*** | (2022.01) |

(Continued)

(52) U.S. Cl.

CPC ............... *B60W 30/06* (2013.01); *G06T 7/13* (2017.01); *G06V 10/443* (2022.01); *G06V 10/751* (2022.01); *G06V 10/82* (2022.01); *G06V 20/586* (2022.01); *G06V 20/588* (2022.01); *G06T 2207/10028* (2013.01); *G06T 2207/20024* (2013.01); *G06T 2207/20084* (2013.01); *G06T 2207/30256* (2013.01); *G06T 2207/30264* (2013.01)

(58) Field of Classification Search

CPC ..................... B60W 30/06; G06T 7/13; G06T 2207/10028; G06T 2207/20024; G06T 2207/20084; G06T 2207/30256; G06T 2207/30264; G06V 10/443; G06V 10/751; G06V 10/82; G06V 20/586; G06V 20/588

USPC ...................... 340/932.2, 933, 937, 988, 990

See application file for complete search history.

(56) References Cited

U.S. PATENT DOCUMENTS 11,182,598 B2 11/2021 Sriram et al.
11,195,331 B2 12/2021 Lee et al.

(Continued)

FOREIGN PATENT DOCUMENTS

DE 102025138465 A1 3/2026

*Primary Examiner* — Anh V La

(74) *Attorney, Agent, or Firm* — IRON SUMMIT IP LLP

(57) ABSTRACT

In various examples, parking area detection for autonomous and/or semi-autonomous systems and applications is described herein. Systems and methods described herein may use a hybrid method to more accurately determine geometries of the parking areas within environments. For instance, sensor data (e.g., image data, etc.) may be processed using one or more edge detection techniques to determine edge features (e.g., two-dimensional pixels, three-dimensional points, etc.) associated with an environment that includes a parking area. A predicted geometry associated with the parking area, as determined using one or more machine learning models, may then be used to filter the edge features in order to identify a portion of the edge features that represent the parking area. One or more optimization techniques may then be used to determine the final geometry associated with the parking area based at least on the filtered edge features.

20 Claims, 25 Drawing Sheets

(51) Int. Cl.

| | |
|---|---|
| ***G06V 10/82*** | (2022.01) |
| ***G06V 20/56*** | (2022.01) |
| ***G06V 20/58*** | (2022.01) |

(56) References Cited

U.S. PATENT DOCUMENTS

| | | | | |
|---|---|---|---|---|
| 11,657,532 | B2 | 5/2023 | Park et al. | |
| 11,981,349 | B2 | 5/2024 | Nister et al. | |
| 2021/0248753 | A1* | 8/2021 | Kaneko | G06T 7/13 |
| 2022/0073055 | A1* | 3/2022 | Kim | G06V 10/443 |
| 2022/0161784 | A1* | 5/2022 | Lee | G06T 7/13 |
| 2023/0058428 | A1* | 2/2023 | Xiao | G06V 10/82 |
| 2024/0227785 | A1* | 7/2024 | Wang | G06V 20/586 |
| 2025/0336089 | A1* | 10/2025 | Choi | G06T 7/74 |

* cited by examiner

BEV
Representation
306

1000

DETERMINE, BASED AT LEAST ON A PREDICTED GEOMETRY ASSOCIATED WITH A PARKING AREA, ONE OR MORE FIRST POINTS
B1002

DETERMINE PARAMETERS ASSOCIATED WITH THE ONE OR MORE FIRST POINTS AND AN ORIENTATION ASSOCIATED WITH THE PARKING AREA
B1004

DETERMINE, BASED AT LEAST ON THE PARAMETERS, SETS OF LINES CORRESPONDING TO GEOMETRIES ASSOCIATED WITH THE PARKING AREA
B1006

DETERMINE, BASED AT LEAST ON SECOND POINTS ASSOCIATED WITH THE PARKING AREA, COSTS ASSOCIATED WITH THE GEOMETRIES
B1008

DETERMINE, BASED AT LEAST ON THE COSTS, AN ACTUAL GEOMETRY OF THE GEOMETRIES
B1010

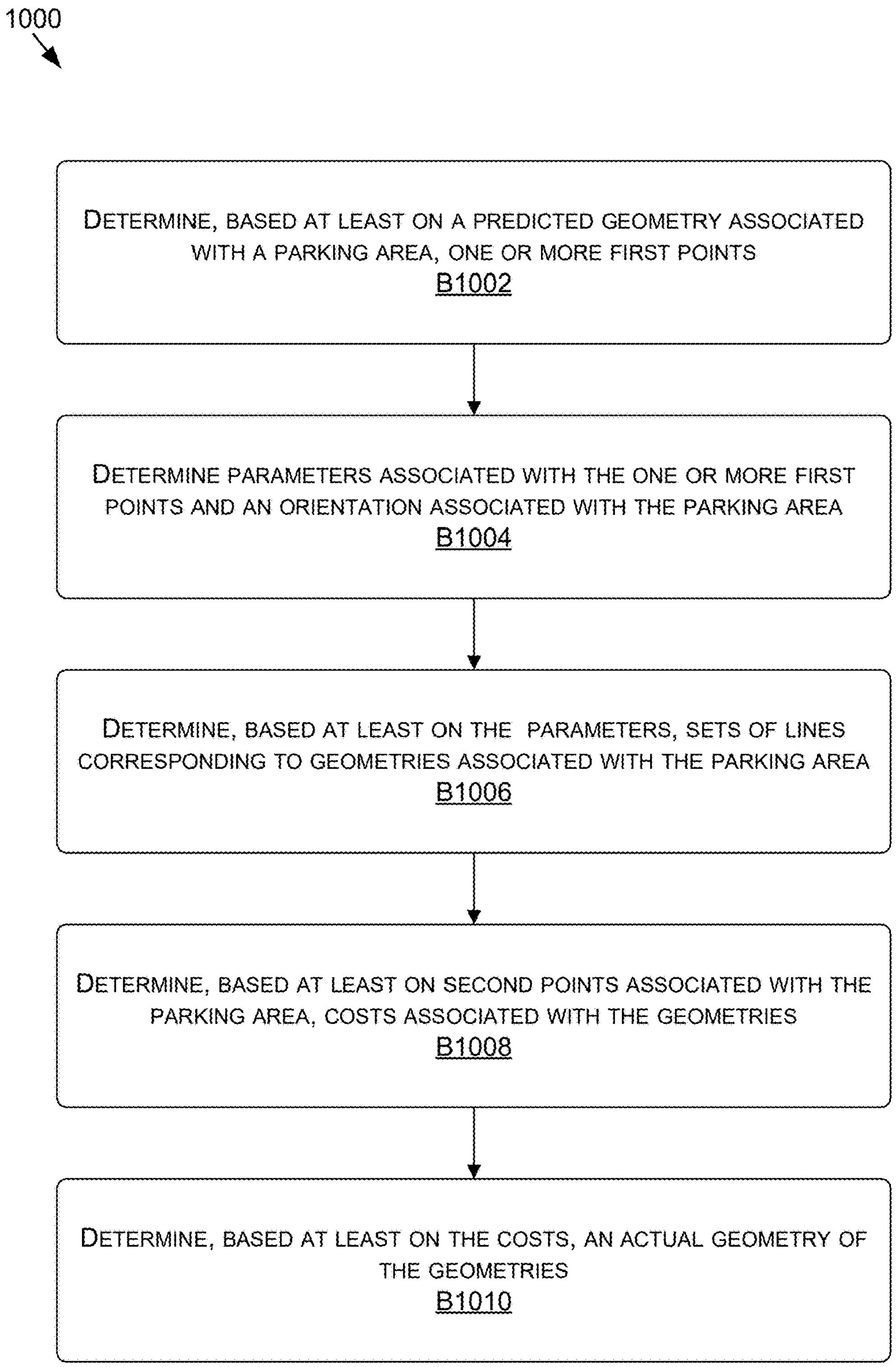

FIGURE 10

SERVER(S) 1278

CPU 1280(A)

CPU 1280(B)

PCIE SWITCH 1282(A)

PCIE SWITCH 1282(B)

PCIE SWITCH 1282(C)

PCIE SWITCH 1282(D)

1286

GPU 1284(A)

GPU 1284(B)

GPU 1284(C)

GPU 1284(D)

GPU 1284(E)

GPU 1284(F)

GPU 1284(G)

GPU 1284(H)

1288

NETWORK(S) 1290

1292

1294

1200

1300

MEMORY
1304

I/O COMPONENTS
1314

CPU(S)
1306

POWER SUPPLY
1316

GPU(S)
1308

PRESENTATION COMPONENT(S)
1318

COMM. INTERFACE
1310

LOGIC UNIT(S)
1320

I/O PORT(S)
1312

1302

PARKING AREA DETECTION

BACKGROUND

Effectively perceiving a surrounding environment is an essential element for various autonomous or semi-autonomous functionalities and tasks for vehicles. In various instances, perception techniques may rely on a combination of sensors—such as camera sensors, LIDAR sensors, and/or RADAR sensors—to collect data from the environment. This data may then be processed using various perception algorithms and/or machine learning models to detect drivable areas, detect objects, classify objects, perform localization, or perform other operations so that a vehicle may navigate safely, make informed decisions, and avoid collisions. For instance, if a vehicle is attempting to park within an environment, the sensor data may be used to identify a geometry of a parking space such that the vehicle is able to safely navigate into the parking space without colliding with surrounding objects.

Conventional systems that detect parking spaces may use machine learning models (e.g., deep neural networks) to process sensor data representing parking spaces located proximate to vehicles or machines. For instance, these machine learning models may be trained or fine-tuned to predict the existence of the parking spaces based on a semantic understanding of parking spaces. However, in at least in some circumstances, these machine learning models may be unable to accurately predict the geometries of the parking spaces—such as the locations of the edges (e.g., the front edges, the left edges, the right edges, and the back edges) of the parking spaces-based on various factors including the quality of the sensor data being processed, the condition or existence of parking space boundary lines/features, and/or the quality of the training that was performed on the machine learning models. Additionally, these problems may become more prevalent when there are errors with sensor calibrations and/or the vehicles are in motion during the processing.

SUMMARY

Embodiments of the present disclosure relate to parking area detection for autonomous and/or semi-autonomous systems and applications. Systems and methods described herein may use a hybrid method to detect parking areas (e.g., parking spaces, parking spots, parking zones, parking region, etc.) within environments—such as by performing edge detection and model processing—in order to more accurately determine the geometries of the parking areas. For instance, sensor data (e.g., image data, etc.) may be processed using one or more edge detection techniques to determine edge features (e.g., two-dimensional (2D) pixels, three-dimensional (3D) points, etc.) associated with an environment that includes a parking area. A predicted geometry associated with the parking area, as determined using one or more machine learning models, may then be used to filter the edge features in order to identify a portion of the edge features that represent the parking area (e.g., filter out edge features associated with other objects such as vehicles, people, etc.). One or more optimization techniques may then be performed on the filtered features to detect edges of the parking area—such as a front edge, a left edge, a right edge, and/or a back edge—where these edges produce a final geometry of the parking area.

In contrast to conventional systems, the systems of the present disclosure, in some embodiments, are able to use both machine learning and edge detection to more accurately determine geometries of parking areas within environments. For instance, conventional systems that just use machine learning processing alone may be unable to accurately predict the geometries of the parking areas, such as the locations of the edges, especially when there are errors in sensor calibration and/or machines are in motion. In contrast, the systems of the present disclosure may use machine learning processing to determine initial predictions for geometries of parking areas, but then use edge detection processing to determine additional features for refining the initial prediction in order to determine more accurate final predictions for geometries of the parking areas.

BRIEF DESCRIPTION OF THE DRAWINGS

The present systems and methods for parking area detection for autonomous and/or semi-autonomous systems and applications are described in detail below with reference to the attached drawing figures, wherein:

FIG. 10 illustrates a flow diagram showing a method for detecting parking areas within an environment using configuration parameters, in accordance with some embodiments of the present disclosure;

DETAILED DESCRIPTION

Figure 1:
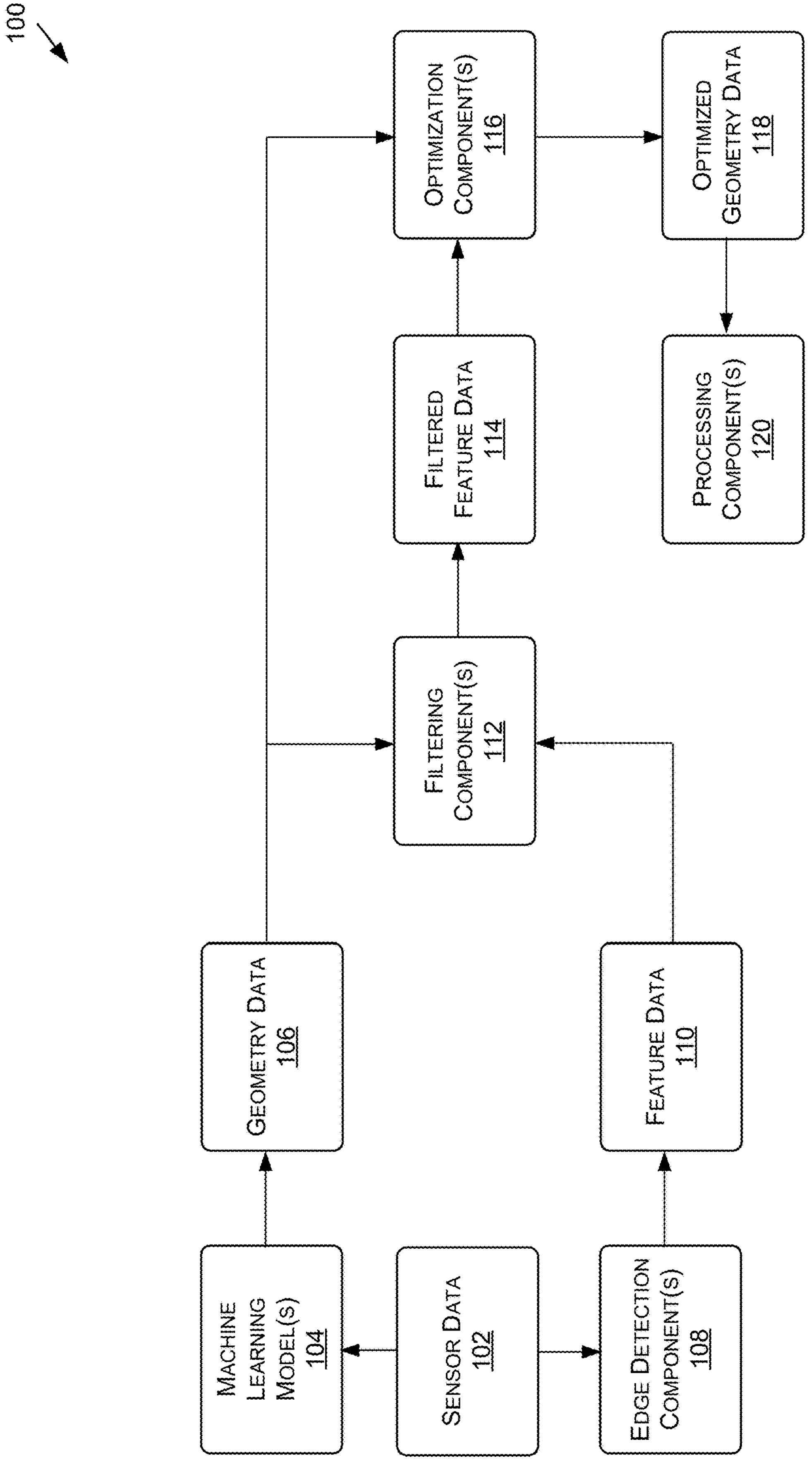
FIG. 1 illustrates an example data flow diagram for a process of detecting parking areas within an environment, in accordance with some embodiments of the present disclosure.

Systems and methods are disclosed related to parking area detection for autonomous and/or semi-autonomous systems and applications. Although the present disclosure may be described with respect to an example autonomous or semi-autonomous vehicle or machine 1200 (alternatively referred to herein as "vehicle 1200," "ego-vehicle 1200," "ego-machine 1200," or "machine 1200," an example of which is described with respect to FIGS. 12A-12D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to detecting parking areas in autonomous or semi-autonomous machine applications, this is not intended to be limiting, and the systems and methods described herein may be used in augmented reality, virtual reality, mixed reality, robotics, security and surveillance, autonomous or semi-autonomous machine applications, and/or any other technology spaces where parking space/spot/region/area detection may be used.

For instance, a system(s) may obtain sensor data generated using one or more sensors of a machine (e.g., an autonomous machine, a semi-autonomous machine, etc.) navigating within an environment. As described herein, the sensor data may include, but is not limited to, image data generated using one or more image sensors, RADAR data generated using one or more RADAR sensors, LiDAR data generated using one or more LiDAR sensors, ultrasonic data generated using one or more ultrasonic sensors, sonar data generated using one or more sonar sensors, and/or any other type of sensor data generated using any other type of sensor. Additionally, in some examples, the sensor data may represent at least a parking area (e.g., a parking spot, a parking space, a designated parking zone, a parking region, a charging station, etc.) located within the environment. In some examples, the parking area may be designated using various physical markings, such as at least a front edge marking, a left edge marking, a right edge marking, and/or a back edge marking. However, in other examples, the parking area may not be designated using physical markings.

The system(s) may then process at least a portion of the sensor data—such as the image data-using one or more machine learning models (model(s)) that are trained to determine geometries associated with parking areas. As described herein, the model(s) may include and/or use any type of network, such as a deep neural network, a convolution neural network, a probabilistic neural network, an autoencoder, a deep stacking network, a transformer network, and/or the like. For instance, based at least on processing the sensor data, the model(s) may output data representing at least the geometry (predicted geometry) of the parking area within the environment. As described herein, the predicted geometry may represent at least a location, a shape, dimensions, and/or an orientation associated with the parking area. For example, if the parking area includes a rectangular parking spot, then the predicted geometry may represent at least predicted locations of the front edge, left edge, the right edge, and/or the back edge of the parking spot.

The system(s) may also process at least a portion of the sensor data—such as the image data-using one or more edge detection techniques in order to determine features (e.g., edge features) associated with the environment. As described herein, the edge detection technique may use one or more algorithms, one or more machine learning models, one or more modules, one or more applications, and/or any other type of processing component that is configured to perform edge detection to determine the features. Additionally, the features may represent two-dimensional (2D) points (e.g., pixels) within one or more images represented by the sensor data, three-dimensional (3D) points within the environment, 2D lines within the image(s), 3D lines within the environment, and/or any other types of features. For example, and for an image, the features may initially represent pixels corresponding to edges of the markings of the parking area, but also pixels that represent additional edges of additional objects, such as vehicles, signs, cones, and/or the like.

As such, the system(s) may filter the features in order to identify a set of features that are associated with the parking area without including features that are associated with the other objects. For instance, the system(s) may use the predicted geometry to determine the features (e.g., the 2D points within the image, the 3D points within the environment, etc.) that likely represent the edges of the parking area. For a first example, and for 2D points associated with an image, the system(s) may identify the 2D points that are likely associated with the edges of the parking area as including 2D points that are within a threshold pixel distance to the outer lines of the predicted geometry as represented by the image. For a second example, and for 3D points associated with the environment, the system(s) may identify the 3D points that are likely associated with the edges of the parking area as including 3D points that are within a threshold distance to the outer lines of the predicted geometry within the environment.

In some examples, the system(s) may perform one or more additional filtering techniques to further filter the set of features. For instance, the system(s) may generate one or more lines that correspond to one or more edges of the parking area using the set of features. For example, the system(s) may generate at least one or more lines (front line(s)) that correspond to a front edge, one or more lines (left line(s)) that correspond to the left edge, one or more lines (right line(s)) that correspond to the right edge, and one or more lines (back line(s)) that corresponds to a back edge of the parking area. In some examples, the system(s) may use various techniques to generate these lines, such as by fitting the lines to the points based on distances between the lines and the points. The system(s) may then identify a subset of features that are associated with the parking area using the lines.

For instance, the system(s) may use the lines to again determine the features (e.g., the 2D points within the image, the 3D points within the environment, etc.) that likely represent the edges of the parking area. For a first example, and for 2D points associated with an image, the system(s) may identify the 2D points that are likely associated with the edges of the parking area as including 2D points that are within another threshold pixel distance to the lines as represented by the image. For a second example, and for 3D points associated with the environment, the system(s) may identify the 3D points that are likely associated with the edges of the parking area as including 3D points that are within another threshold distance to the lines within the environment. As such, by performing one or more of these filtering processes, the set of features and/or the subset of features, which may also be referred to as "filtered features," may include points within the environment that are located on and/or approximate to the actual edges (e.g., markings) of the parking area within the environment.

The system(s) may then perform an optimization technique to determine an actual geometry associated with the parking area based at least on the predicted geometry and the filtered features. For instance, the system(s) may use the predicted geometry to determine any number of points associated with the parking area, such as two points representing two opposite corners of the parking area. The system(s) may then use the points from the filtered features, the point(s) from the predicted geometry, and parameters to determine a final set of lines that represents the edges of the parking area. As described herein, the system(s) may use any number of parameters, such as parameters representing at least two degrees of freedom for a first point associated with a first corner of the parking area, two degrees of freedom for a second point associated with a second corner of the parking area, and one degree of freedom associated with an orientation of the parking area.

In such an example, the two degrees of freedom may include movements of the points within the x-coordinate direction and the y-coordinate direction and the one degree of freedom may include a rotation associated with a yaw. Additionally, there may be ranges for each degree of freedom, such as a first range for the x-coordinate direction that includes moving a point a number of distances (e.g., 5) in a first direction and a number of distances (e.g., 5) in a second direction, a second range for the y-coordinate direction that includes moving a point a number of distances (e.g., 5) in a third direction and a number of distances (e.g., 5) in a fourth direction, and a range for the yaw angle that includes rotating the yaw a number of angles (e.g., 5) in a first rotational direction and a second number of angles (e.g., 5) in a second rotational direction. The system(s) may then determine the actual geometry by performing optimization using the points and the parameters.

For example, the system(s) may predict a set of lines that represents the actual geometry using the corner points and values for the degrees of freedom. The system(s) may then determine a cost associated with the set of lines, such as based on distances between the set of lines and the points from the filtered features. Additionally, the system(s) may perform similar processes to determine one or more additional costs associated with one or more additional sets of lines. The system(s) may then use the costs to select the final set of lines that best represents the actual geometry associated with the parking area. For example, the system(s) may select the final set of lines that is associated with the lowest cost. As such, the actual geometry associated with the parking area may include at least the locations of the edges—such as the front edge, the left edge, the right edge, and the back edge—of the parking area.

In some examples, the system(s) may perform one or more additional and/or alternative optimization techniques to determine the actual geometry. For instance, such as when multiple images generated using different cameras represent the parking area, the system(s) may use respective filtered features associated with each image to determine possible geometries associated with the parking area as represented by each image. The system(s) may then use the possible geometries associated with the images to determine the actual geometry associated with the parking area. For example, and as described in more detail herein, the system(s) may use the possible geometries to determine a final set of lines that best represents the actual geometry, where the actual geometry again includes the locations of the edges of the parking area. While these are just two example optimization techniques for performing optimization using the predicted geometry and the features associated with the parking area, in other examples, the system(s) may use one or more additional optimization techniques to determine the actual geometry using the predicted geometry and the features.

In some examples, the system(s) may perform additional processing using the actual geometry associated with the parking area. For instance, the system(s) may use actual geometries determined over a period of time (e.g., one second, two seconds, five seconds, etc.) to determine a final geometry associated with the parking area, such as by smoothing the actual geometries over the period of time. Additionally, the system(s) may then perform one or more operations using the final geometry, such as determining one or more paths for the machine to navigate to park within the parking area. As such, by performing the processes described herein, the system(s) is able to determine more accurate geometries for parking area, which may increase the safety for machines when navigating within environments.

In some embodiments, the systems and methods described herein may be performed within a simulation environment (e.g., NVIDIA's DriveSIM) using simulated data (e.g., simulated sensor data of simulated sensors of a virtual or simulated machine). For example, simulated sensor data may be used to perform various operations within the simulation environment, such as to perform parking area detection within the simulated environment. These simulated operations may be used to test performance of the underlying algorithms, systems, and/or processes prior to deploying them in the real-world. In some instances, the simulation may be used to generate synthetic training data—e.g., training data including landmarks, features, objects, parking area geometries, etc.—so that the synthetic training data (in addition to or alternatively from real-world data) may then be processed to perform parking area detection In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

In some examples, one or more of the machine learning models described herein may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model may be accessible via one or more APIs—such as REST APIs. As such, and in some embodiments, the machine learning models described herein may be deployed as an inference microservice to accelerate deployment of models on any cloud, data center, or edge computing system (e.g., in-vehicle or in-machine), while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and/or other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing vision language models (VLMs), systems implementing multi-modal language models, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of detecting parking areas within an environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

For instance, the process 100 may include a machine (e.g., an example autonomous or semi-autonomous vehicle or machine 1200) generating sensor data 102 using one or more sensors. As described herein, the sensor data 102 may include, but is not limited to, image data generated using one or more image sensors (e.g., one or more cameras), LiDAR data generated using one or more LiDAR sensors, RADAR data generated using one or more RADAR sensors, ultrasonic data generated using one or more ultrasonic sensors, sonar data generated using one or more sonar sensors, and/or any other type of sensor data generated using any other type of sensor. Additionally, the sensor data 102 may represent the environment that at least partially surrounding the machine, where the environment may include one or more parking areas (e.g., one or more parking spots, one or more parking spaces, one or more parking zones, etc.) around the machine.

Figure 2:
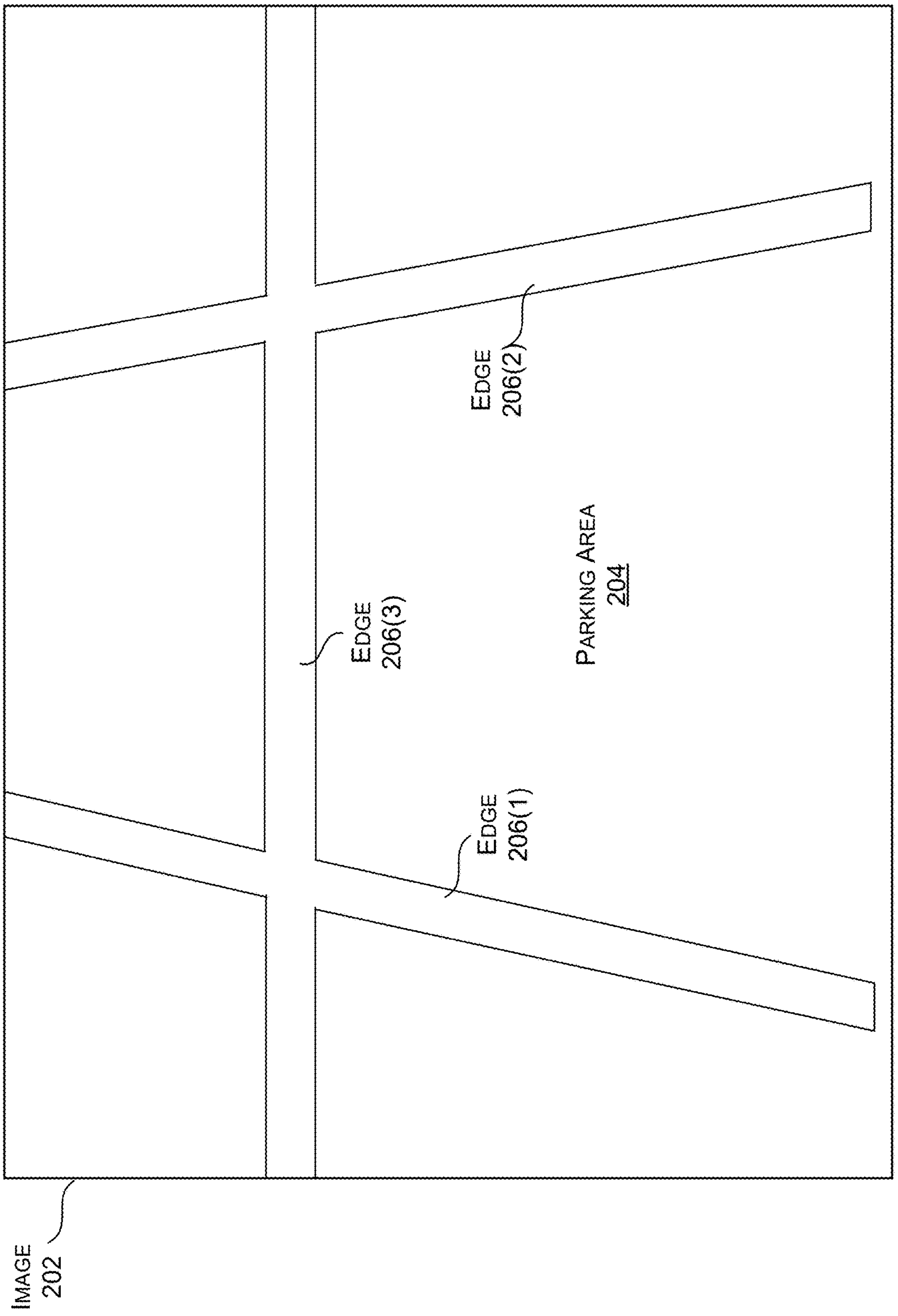
FIG. 2 illustrates an example of an image of an environment that includes a parking area, in accordance with some embodiments of the present disclosure.

For instance, FIG. 2 illustrates an example of an image 202 of an environment that includes a parking area 204, in accordance with some embodiments of the present disclosure. As shown, the image 202 may represent the parking area 204 that includes a geometry defined by at least a left edge 206(1), a right edge 206(2), and a back edge 206(3) (which may each be referred to singularly as just an "edge 206" or in plural as "edges 206"). While the example of FIG. 2 illustrates the parking area 204 as being defined by edges 206 that are physically marked, in other examples, one or more of the edges of a parking area may be not be physically marked. For example, if a parking area is associated with a parking zone on a side of a road, where other vehicles are already parked within the parking zone, then a parking area may be defined using one or more portions of the other vehicles (e.g., bumpers of the other vehicles) and/or a curb.

Referring back to the example of FIG. 1, the process 100 may include one or more machine learning models 104 processing at least a portion of the sensor data 102, such as the image data. As described herein, the model(s) 104 may include and/or use any type of network, such as a deep neural network, a convolution neural network, a probabilistic neural network, an autoencoder, a deep stacking network, and/or the like. Based at least on the processing, the process 100 may include the model(s) 104 generating and/or outputting geometry data 106 representing a predicted geometry associated with the parking area. As described herein, in some examples, the predicted geometry may represent at least a location, a shape, dimensions, and/or an orientation associated with the parking area. For example, if the parking area includes a rectangular parking spot, then the predicted geometry may represent at least approximate locations of the front edge, the left edge, the right edge, and the back edge of the parking spot.

Figure 3A:
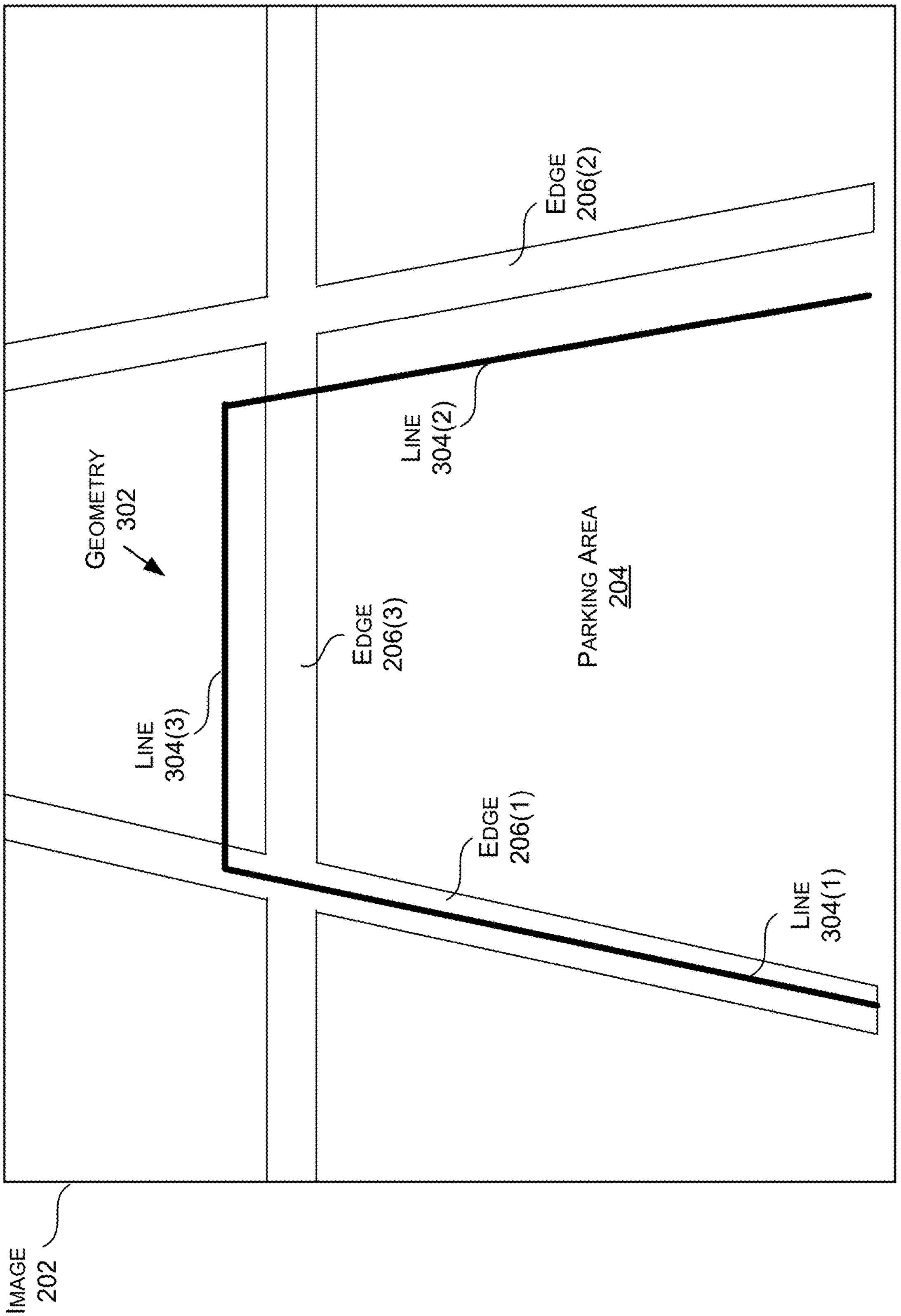
FIGS. 3A-3B illustrate examples of one or more machine learning models predicting a geometry associated with a parking area, in accordance with some embodiments of the present disclosure.
Figure 3B:
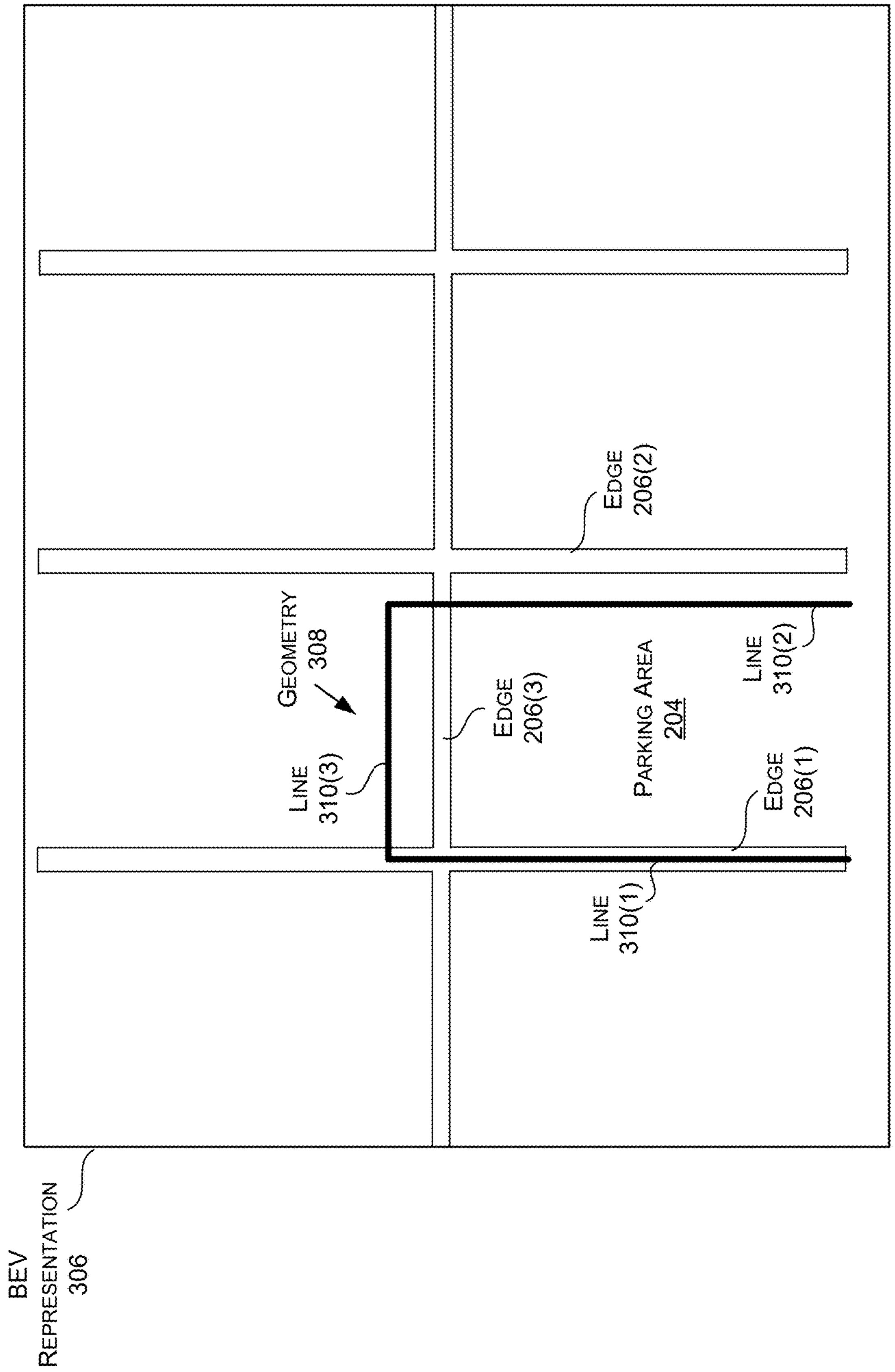

For instance, FIGS. 3A-3B illustrate examples of one or more machine learning models predicting a geometry associated with the parking area 204, in accordance with some embodiments of the present disclosure. As shown by the example of FIG. 3A, the output from the model(s) 104 (with postprocessing in some examples) may include at least a 2D predicted geometry 302 associated with the parking area 204 as represented by the image 202, where the 2D predicted geometry 302 includes at least lines 304(1)-(3) (also referred to singularly as "line 304" or in plural as "lines 304"). For instance, the left line 304(1) may predict the location of the left edge 206(1), the right line 304(2) may predict the location of the right edge 206(2), and the back line 304(3) may predict the location of the back edge 206(3).

As shown by the example of FIG. 3B, in some examples, the output from the model(s) 104 may include a BEV representation 306 of the environment that includes a 3D predicted geometry 308 associated with the parking area 204. However, in other examples, the 3D predicted geometry 308 may be determined by projecting the 2D predicted geometry 302 from the image 202 to the real-world environment. Additionally, the 3D predicted geometry 308 may also include lines 310(1)-(3) (also referred to singularly as "line 310" or in plural as "lines 310"), where the left line 310(1) may predict the location of the left edge 206(1), the right line 310(2) may predict the location of the right edge 206(2), and the back line 310(3) may predict the location of the back edge 206(3). While the predicted geometries 302 and 308 associated with FIGS. 3A-3B represent pretty accurate representations of the parking area 204, the predicted geometries 302 and 308 may be improved using one or more of the processes described herein.

For instance, and referring back to the example of FIG. 1, the process 100 may include one or more edge detecting components 108 processing at least a portion of the sensor data 102, such as the image data. As described herein, the edge detection component(s) 108 may include and/or use one or more algorithms, one or more machine learning models, one or more modules, one or more applications, and/or any other type of processing component that is configured to perform edge detection to determine the features. Based at least on the processing, the process 100 may then include the edge detection component(s) 108 generating and/or outputting feature data 110 representing features associated with the parking area and/or at least a portion of the environment surrounding the parking area. In some examples, the features may include 2D points (e.g., pixels) within one or more images represented by the sensor data 102, 2D lines within the image(s), 3D points within the environment, and/or lines within the environment that correspond to the edges.

Figure 4A:
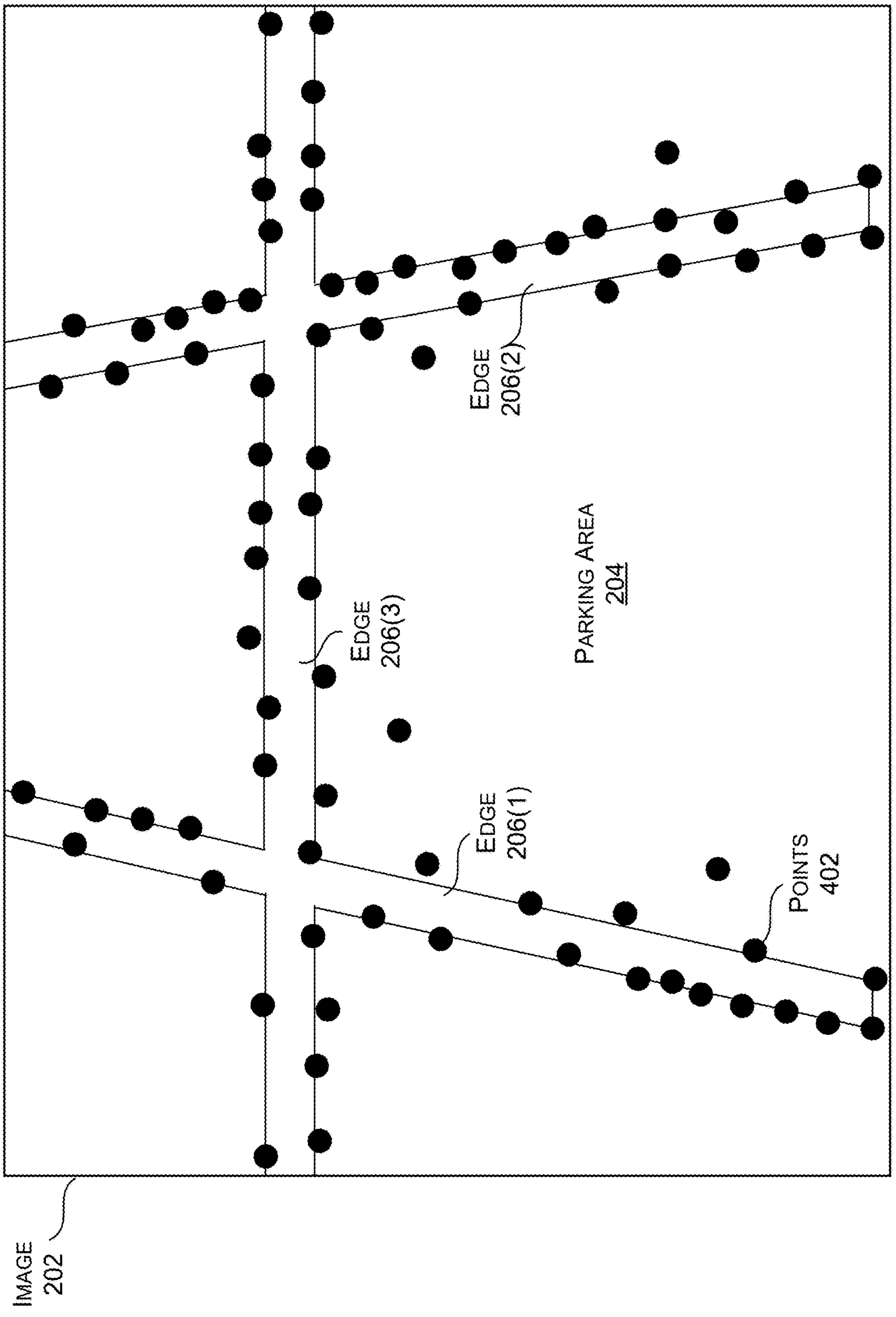
FIGS. 4A-4B illustrate examples of one or more edge detection components determining features associated with an environment, in accordance with some embodiments of the present disclosure.
Figure 4B:
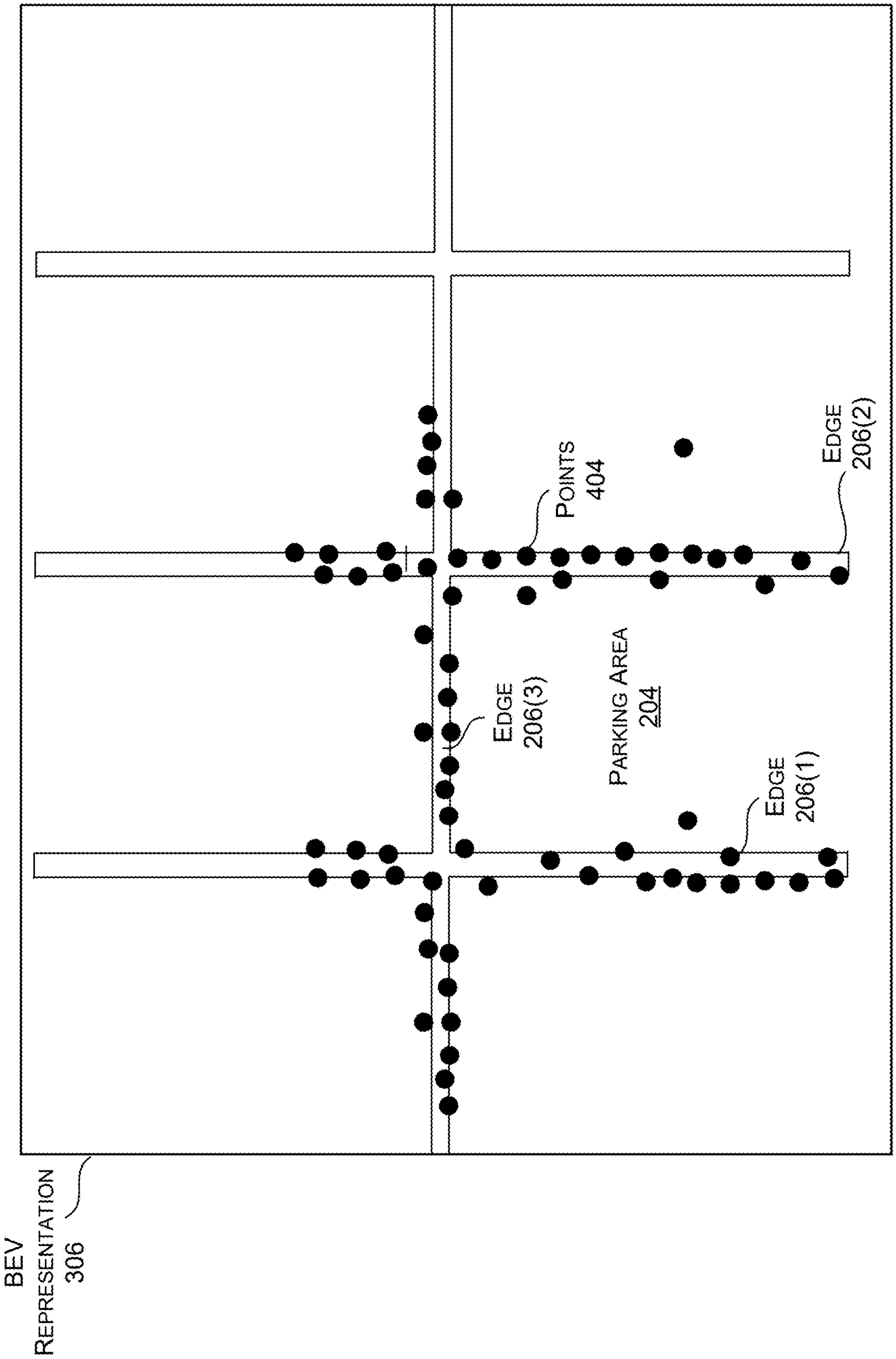

For instance, FIGS. 4A-4B illustrate examples of one or more edge detection components determining features associated with an environment, in accordance with some embodiments of the present disclosure. As shown by the example of FIG. 4A, the output from the edge detection component(s) 108 (e.g., with postprocessing in some examples) may include at least 2D points 402 (although only one is labeled for clarity reasons) associated with the image 202 that represent various edges, such as the markings associated with the parking areas. In some examples, the 2D points 402 may include pixels of the image 202 that represent the various edges. While the example of FIG. 4A only illustrates determining 2D points for markings associated with parking areas, in other examples, similar processes may be used to determine 2D points associated with other types of edges represented by images, such as edges of vehicles, traffic signs, traffic features, and/or any other object.

As illustrated by the example of FIG. 4B, in some examples, the output from the edge detection component(s) 108 may include 3D points 404 (although only one is labeled for clarity reasons) within the environment. Additionally, or alternatively, in some examples, the 3D points 404 may be determined based at least on projecting the 2D points 402 from the image 202 to the environment. In any of the examples, the 3D points 404 may represent edges associated with the environment, such as the markings of the parking areas within the environment. Again, while the example of FIG. 4B only illustrates determining 3D points for markings associated with parking areas, in other examples, similar processes may be used to determine 3D points associated with other types of edges, such as edges of vehicles, traffic signs, traffic features, and/or any other object.

Referring back to the example of FIG. 1, the process 100 may include using one or more filtering components 112 to filter at least a portion of the feature data 110 using one or more filtering processes. For instance, the filtering component(s) 112 may filter at least a portion of the features in order to identify a set of features that is associated with the parking area without including features that are associated with the other objects. For instance, the filtering component(s) 112 may use the predicted geometry from the geometry data 106 to determine the features (e.g., the 2D points within the image, the 3D points within the environment, etc.) that likely represent the edges of the parking area. For a first example, and for 2D points associated with an image, the filtering component(s) 112 may identify the 2D points that are likely associated with the edges of the parking area as including 2D points that are within a threshold pixel distance to outer lines of the predicted geometry as represented by the image. For a second example, and for 3D points associated with the environment, the filtering component(s) 112 may identify the 3D points that are likely associated with the edges of the parking area as including 3D points that are within a threshold distance to the outer lines of the predicted geometry within the environment.

Figure 5A:
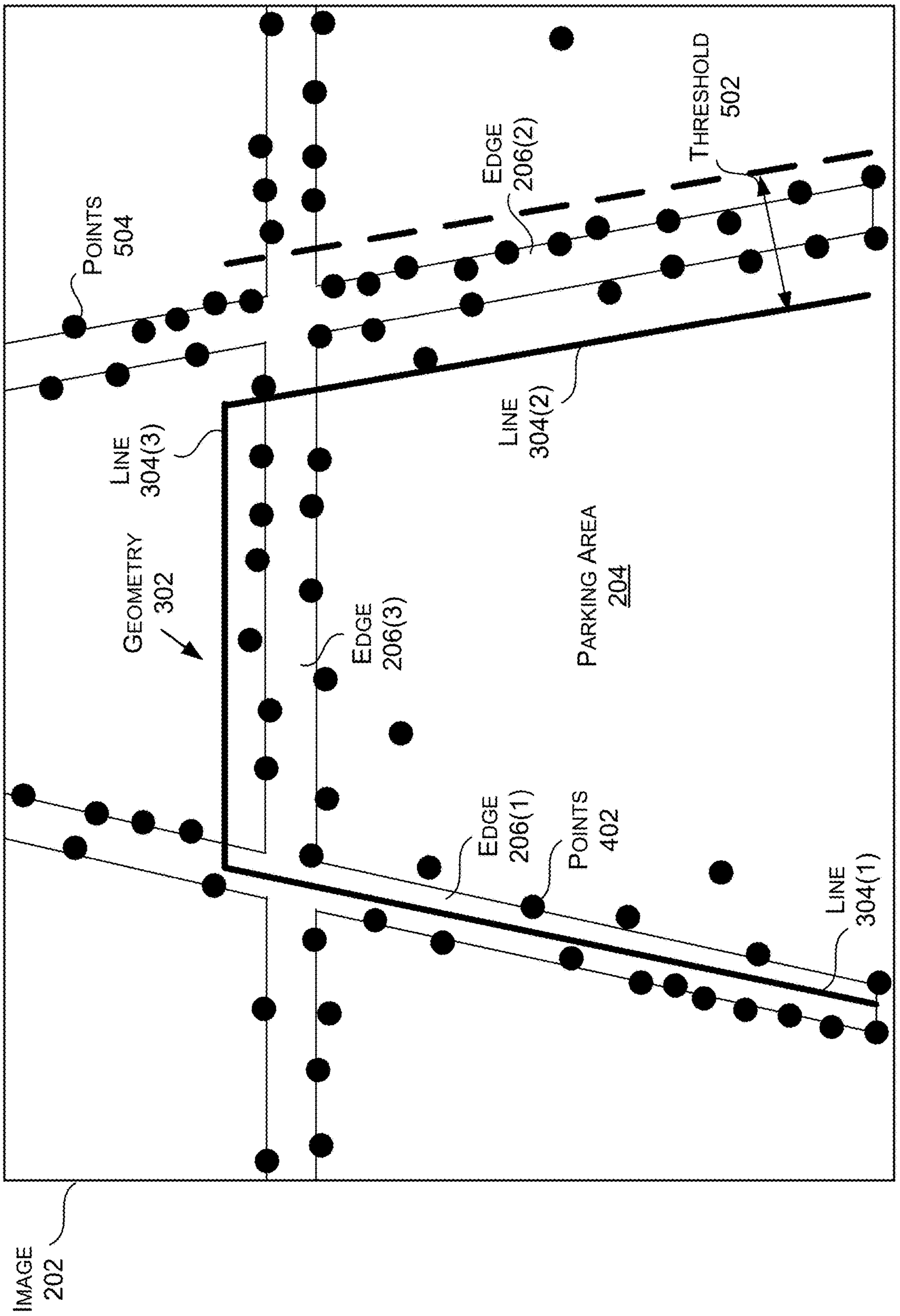
FIGS. 5A-5B illustrate examples of filtering features associated with an environment to identify a set of features associated with a parking area, in accordance with some embodiments of the present disclosure.
Figure 5B:
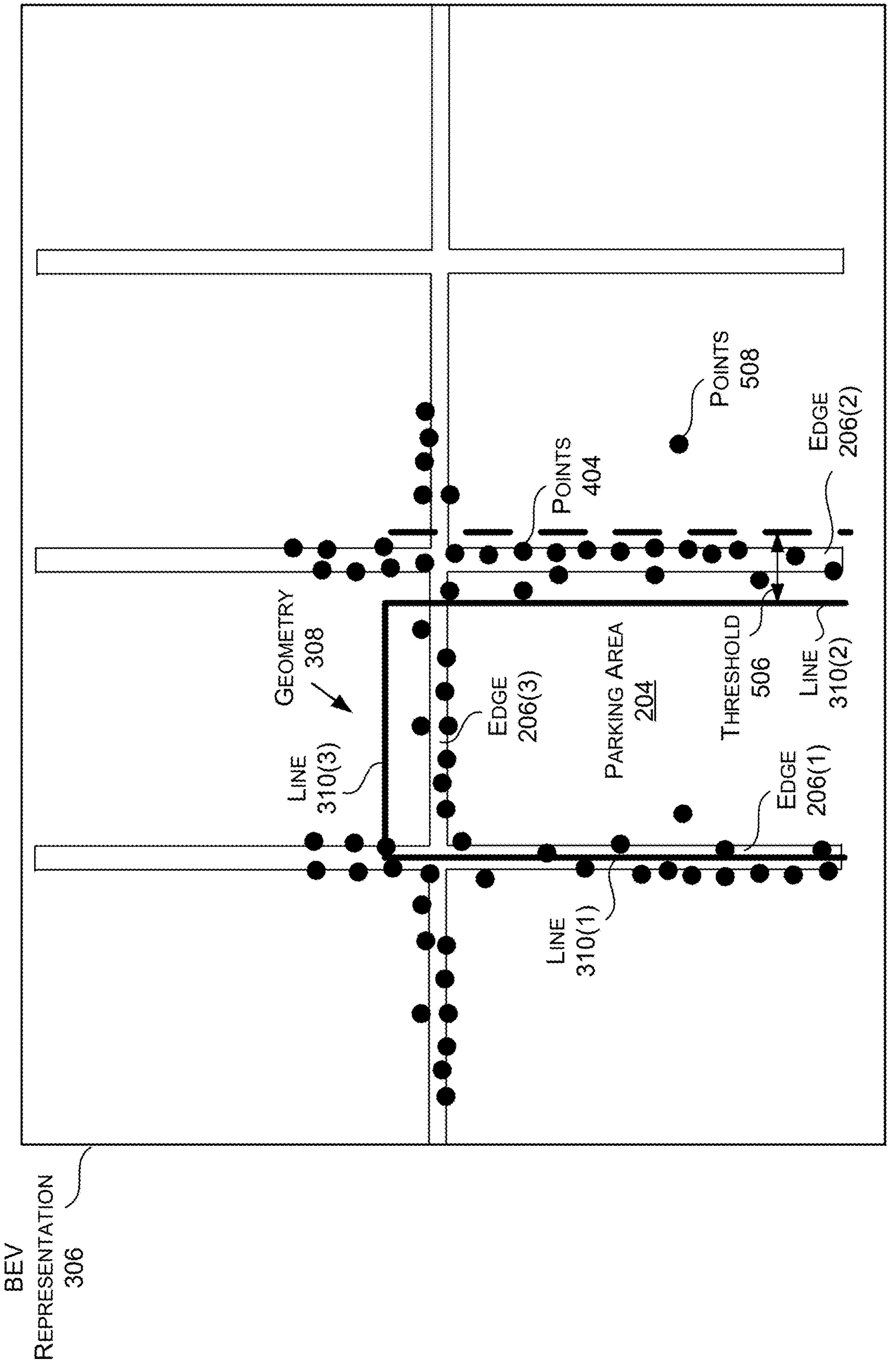

For more details, FIGS. 5A-5B illustrate examples of filtering features associated with an environment to identify a set of features associated with the parking area 204, in accordance with some embodiments of the present disclosure. As illustrated by the example of FIG. 5A, in the 2D image space, the filtering component(s) 112 may use a threshold 502 around the lines 304 of the predicted geometry 302 to identify a portion of the 2D points 402 (e.g., a set of the 2D points 402) that are likely to be associated with the parking area 204. Additionally, the filtering component(s) 112 may remove other 2D points 504 that are located outside of the threshold 502, which is further indicated by gray shading. While the example of FIG. 5A just illustrates one example of the threshold 502 that extends to the right of the right line 304(2), in other examples, the filtering component(s) 112 may use thresholds 502 associated with each side of the lines 304. In some examples, the threshold 502 may be associated with a threshold number of pixels. Additionally, or alternatively, in some examples, the threshold 502 may be associated with a threshold distance.

Next, and as illustrated by the example of FIG. 5B, in the 3D world-space environment, the filtering component(s) 112 may use a threshold 506 around the lines 310 of the predicted geometry 308 to identify a portion of the 3D points 404 (e.g., a set of the 3D points 404) that are likely to be associated with the parking area 204. Additionally, the filtering component(s) 112 may remove other 3D points 508 that are located outside of the threshold 506, which is further indicated by gray shading. While the example of FIG. 5B just illustrates one example of the threshold 506 that extends to the right of the right line 410(2), in other examples, the filtering component(s) 112 may use thresholds 506 associated with each side of the lines 310. In some examples, the threshold 506 may be associated with a threshold distance, such as 10 centimeters, 40 centimeters, 80 centimeters, and/or any other distance.

Referring back to the example of FIG. 1, in some examples, the filtering component(s) 112 may perform one or more further filtering techniques to further filter one or more features from the set of features. For instance, the filtering component(s) 112 may generate one or more lines that correspond to one or more edges of the parking area using the set of features. For example, the filtering component(s) 112 may generate at least one or more lines (front line(s)) that correspond to a front edge, one or more lines (left line(s)) that corresponds to the left edge, one or more lines (right line(s)) that corresponds to the right edge, and one or more lines (back line(s)) that corresponds to a back edge of the parking area. In some examples, the filtering component(s) 112 may use various techniques to identify these lines, such as by fitting the lines to the features based on distances between the lines and the features. The filtering component(s) 112 may then identify a subset of the features that is associated with the parking area using the lines.

For instance, the filtering component(s) 112 may use the lines to again determine the features (e.g., the 2D points within the image, the 3D points within the environment, etc.) that likely represent the edges of the parking area. For a first example, and for 2D points associated with an image, the filtering component(s) may identify the 2D points that are likely associated with the edges of the parking area as including 2D points that are within another threshold pixel distance to the lines as represented by the image. For a second example, and for 3D points associated with the environment, the filtering component(s) 112 may identify the 3D points that are likely associated with the edges of the parking area as including 3D points that are within another threshold distance to the lines within the environment. As such, by performing one or more of these filtering processes, the subset of features may include points within the environment that are located on and/or approximate to the actual edges (e.g., markings) of the parking area within the environment.

Figure 6A:
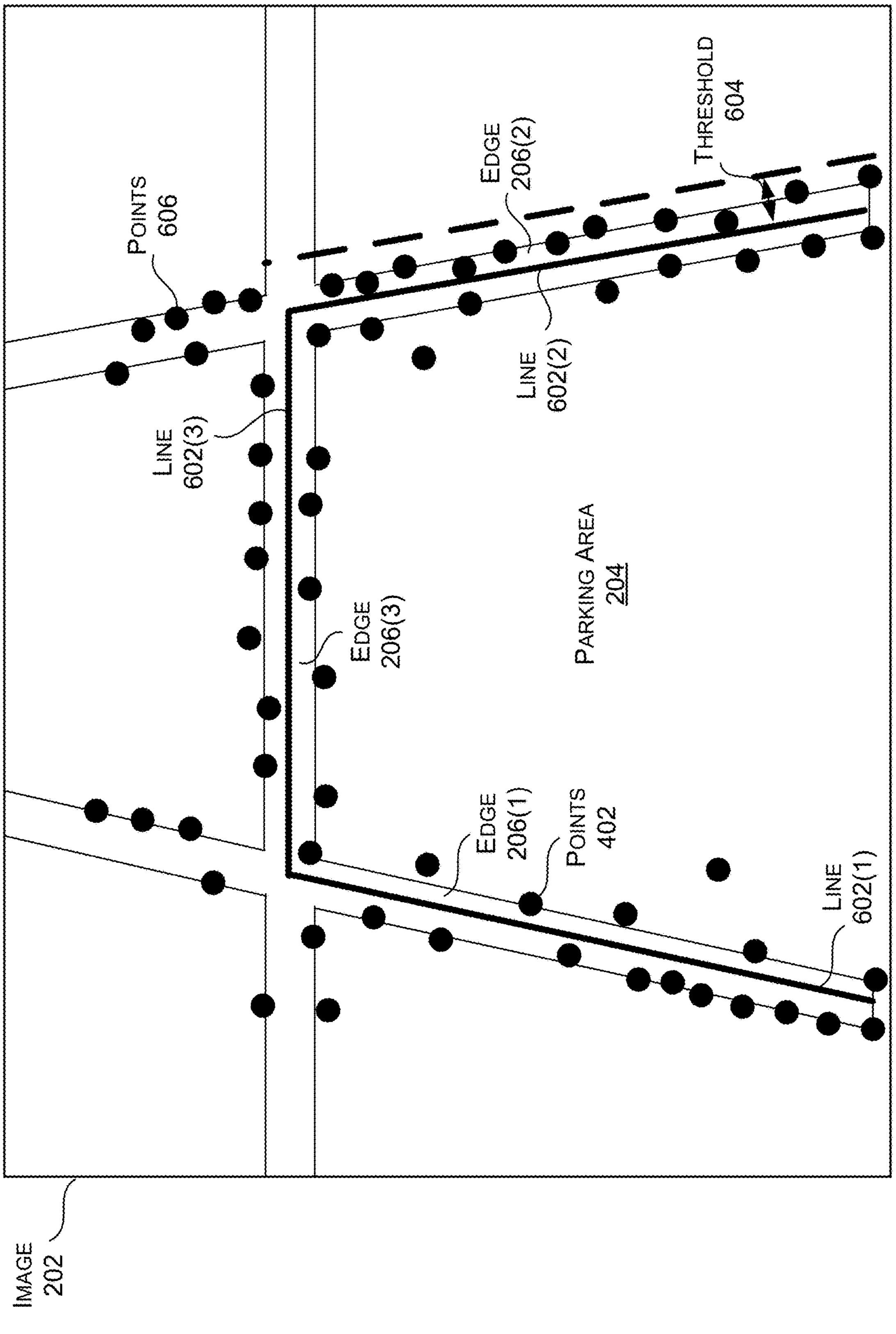
FIGS. 6A-6B illustrate examples of further filtering a set of features associated with an environment to identify a subset of features associated with a parking area, in accordance with some embodiments of the present disclosure.
Figure 6B:
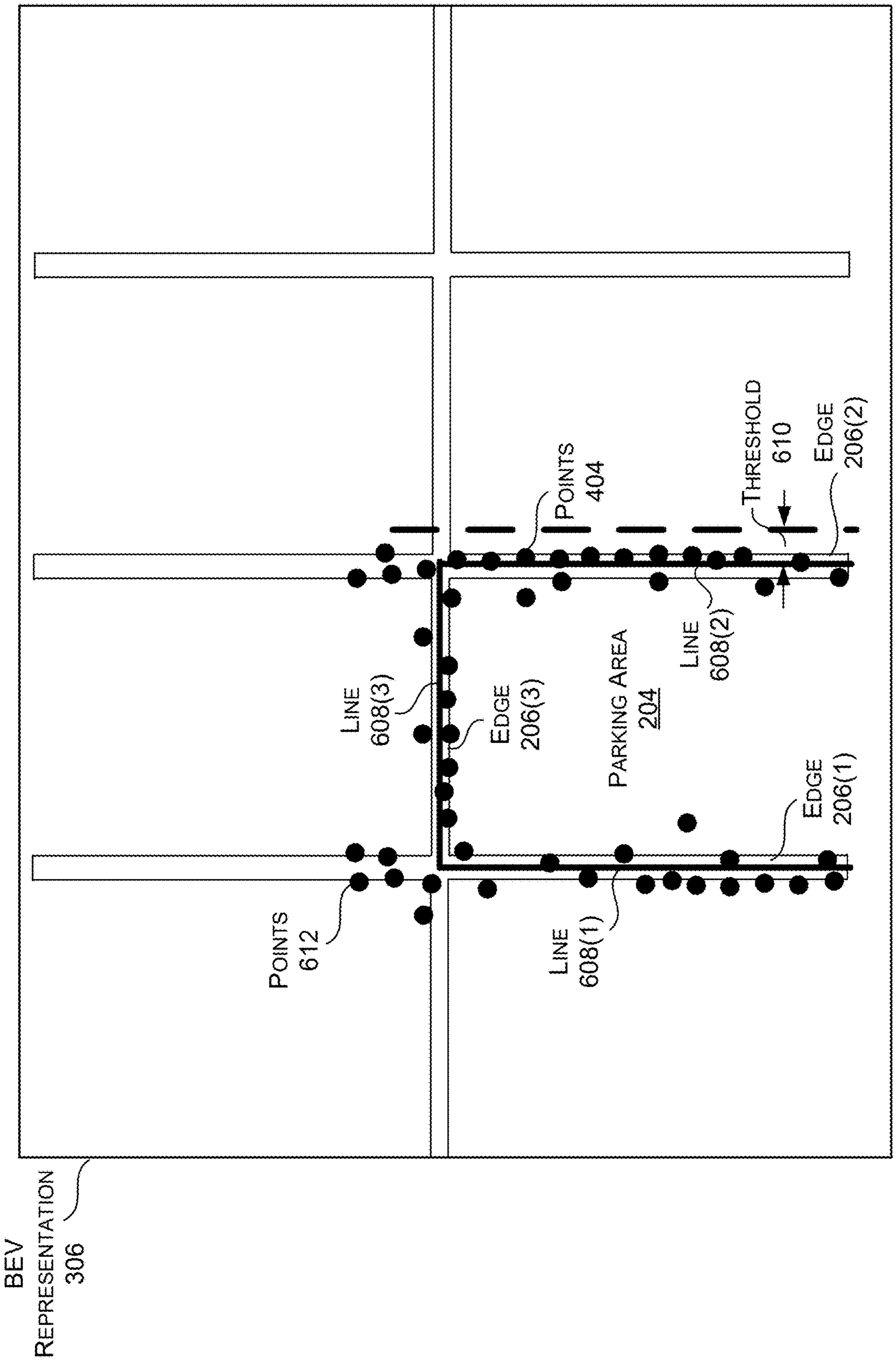

For more details, FIGS. 6A-6B illustrate examples of further filtering a set of features associated with an environment to identify a subset of features associated with the parking area 204, in accordance with some embodiments of the present disclosure. As illustrated by the example of FIG. 6A, in the 2D image space, the filtering component(s) 112 may initially determine lines 602(1)-(3) (also referred to singularly as "line 602" or in plural as "lines 602") associated with the edges 206 of the parking area 204. In some examples, the filtering component(s) 112 may use various techniques to determine the lines 602, such as by using the set of the points 2D points 402 that are still remaining after the initial filtering process. For example, the filtering component(s) 112 may use a fitting process that minimizes the distances between the lines 602 and the set of the 2D points 402. While the example of FIG. 6A only illustrates determining a single line 602 for each of the edges 206, in other examples, the filtering component(s) 112 may determine any number of lines associated with each of the edges 206.

The filtering component(s) 112 may use then a threshold 604 around the lines 602 to identify another portion of the 2D points 402 (e.g., a subset of the 2D points 402) that are likely to be associated with the parking area 204. Additionally, the filtering component(s) 112 may remove other 2D points 606 that are located outside of the threshold 604, which is further indicated by gray shading. While the example of FIG. 6A just illustrates one example of the threshold 604 that extends to the right of the right line 602(2), in other examples, the filtering component(s) 112 may use thresholds 604 associated with each side of the lines 602. In some examples, the threshold 604 may be associated with a threshold number of pixels. Additionally, or alternatively, in some examples, the threshold 604 may be associated with a threshold distance. In either of the examples, such as to ensure that the subset of the 2D points 402 represents the actual edges 206 of the parking area 204, the threshold 604 used for the further filtering process may be less than the threshold 502 used during the initial filtering process.

Next, as illustrated by the example of FIG. 6B, in the 3D world-space environment, the filtering component(s) 112 may again determine lines 608(1)-(3) (also referred to singularly as "line 608" or in plural as "lines 608") associated with the edges 206 of the parking area 204. In some examples, the filtering component(s) 112 may determine the lines 608 by projecting the lines 602 from the 2D image space to the 3D world-space environment. In some examples, the filtering component(s) 112 may determine the lines using the set of the 3D points 404 that are still remaining after the initial filtering process. For example, the filtering component(s) 112 may use a fitting process that minimizes the distances between the lines 608 and the set of the 3D points 404. While the example of FIG. 6B only illustrates determining a single line 608 for each of the edges 206, in other examples, the filtering component(s) 112 may determine any number of lines associated with each of the edges 206.

The filtering component(s) 112 may then use a threshold 610 around the lines 608 to identify another portion of the 3D points 404 (e.g., a subset of the 3D points 404) that are likely to be associated with the parking area 204. Additionally, the filtering component(s) 112 may remove other 3D points 612 that are located outside of the threshold 610, which is further indicated by gray shading. While the example of FIG. 6B just illustrates one example of the threshold 610 that extends to the right of the right line 608(2) in other examples, the filtering component(s) 112 may use thresholds 610 associated with each side of the lines 608. In some examples, the threshold 610 may be associated with a threshold distance, such as 10 centimeters, 40 centimeters, 80 centimeters, and/or any other distance. Additionally, in some examples, such as to ensure that the subset of the 3D points 404 represents the actual edges 206 of the parking area 204, the threshold 610 used for the further filtering process may be less than the threshold 506 used during the initial filtering process.

Referring back to the example of FIG. 1, the filtering component(s) 112 may perform further processes with respect to the filtered features (e.g., the set of features, the subset of features, etc.). For instance, the filtering component(s) 112 may classify one or more (e.g., each) of the features as being associated with one of the edges of the parking area. For example, the filtering component(s) 112 may classify a first portion of the filtered features as being associated with the front edge, a second portion of the filtered features as being associated with the left edge, a third portion of the filtered features as being associated with the right edge, and a fourth portion of the filtered features as being associated with the back edge of the parking area. In some examples, the filtering component(s) 112 may perform various techniques to classify the features.

For instance, in the further filtering process, the filtering component(s) 112 may determine at least the front line associated with the front edge, the left line associated with the left edge, the right line associated with the right edge, and the back line associated with the back edge of the parking area. As such, the filtering component(s) 112 may classify the features based on the proximities of the features to these lines. For example, and for a feature, the filtering component(s) 112 may determine which line the feature is closest. The filtering component(s) 112 may then associate the feature with the edge that is associated with the closest line. For example, if the closest line includes the right line, then the filtering component(s) 112 may associate the feature with the right edge of the parking area. The filtering component(s) 112 may then perform similar processes to associate one or more (e.g., each) of the other features with the edges of the parking area. As shown by the example of FIG. 1, the output from the filtering component(s) 112 may include filtered feature data 114 representing the filtered features and/or the classifications associated with the filtered features.

The process 100 may then include one or more optimization components 116 using the filtered feature data 114 and/or the geometry data 106 to determine an actual geometry associated with the parking area. For instance, and for a first optimization technique, the optimization component (s) 116 may use the predicted geometry from the geometry data 106 to determine one or more features associated with the parking area, such as two points associated with opposite corners of the parking area. The optimization component(s) 116 may then use the feature(s) from the predicted geometry, the filtered features from the filtered feature data 114, and one or more parameters associated with the parking area to determine final lines that represent the edges of the parking area.

Figure 7A:
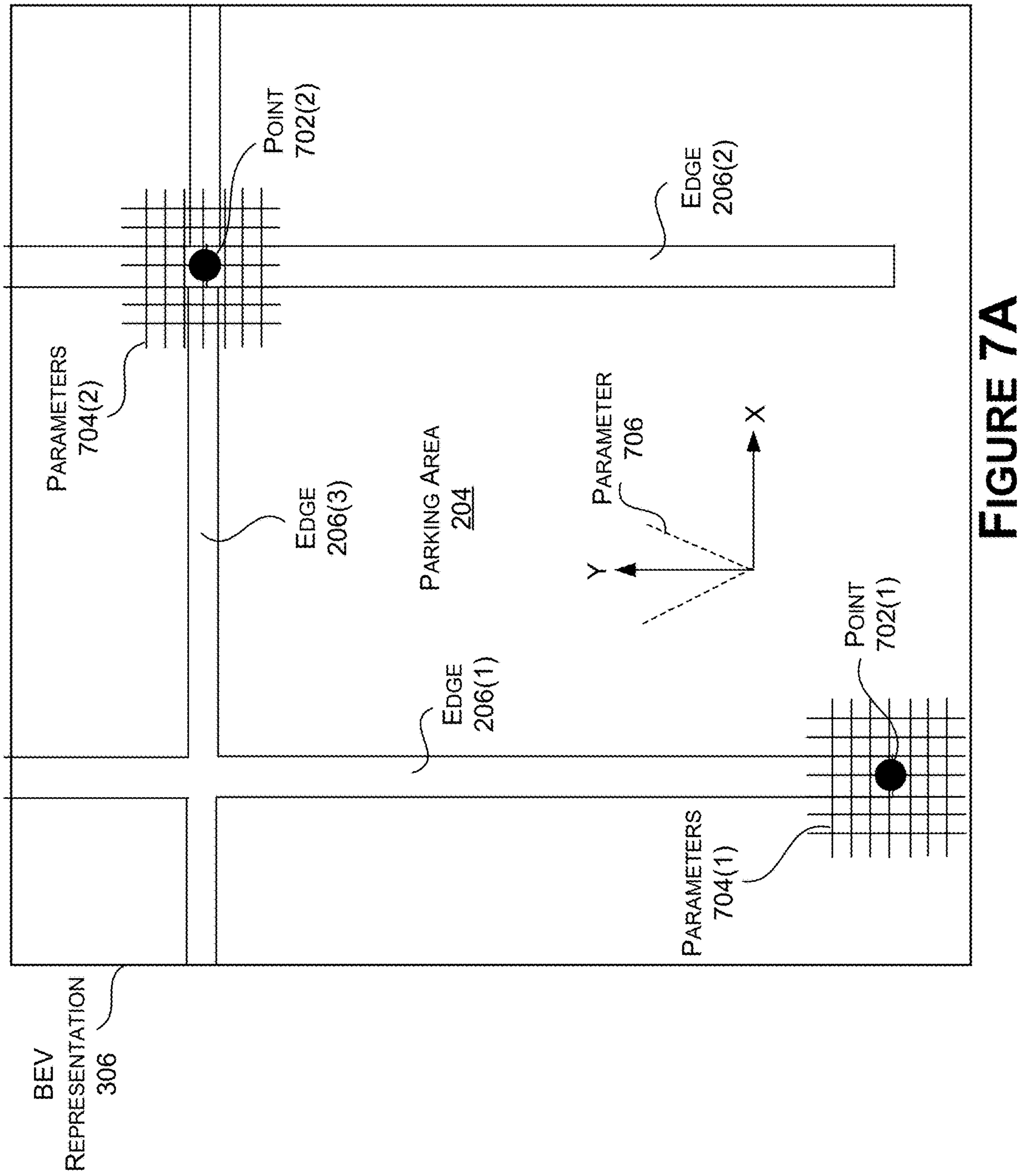
FIGS. 7A-7C illustrate an example of a first optimization technique to determine an actual geometry associated with a parking area, in accordance with some embodiments of the present disclosure.
Figure 7B:
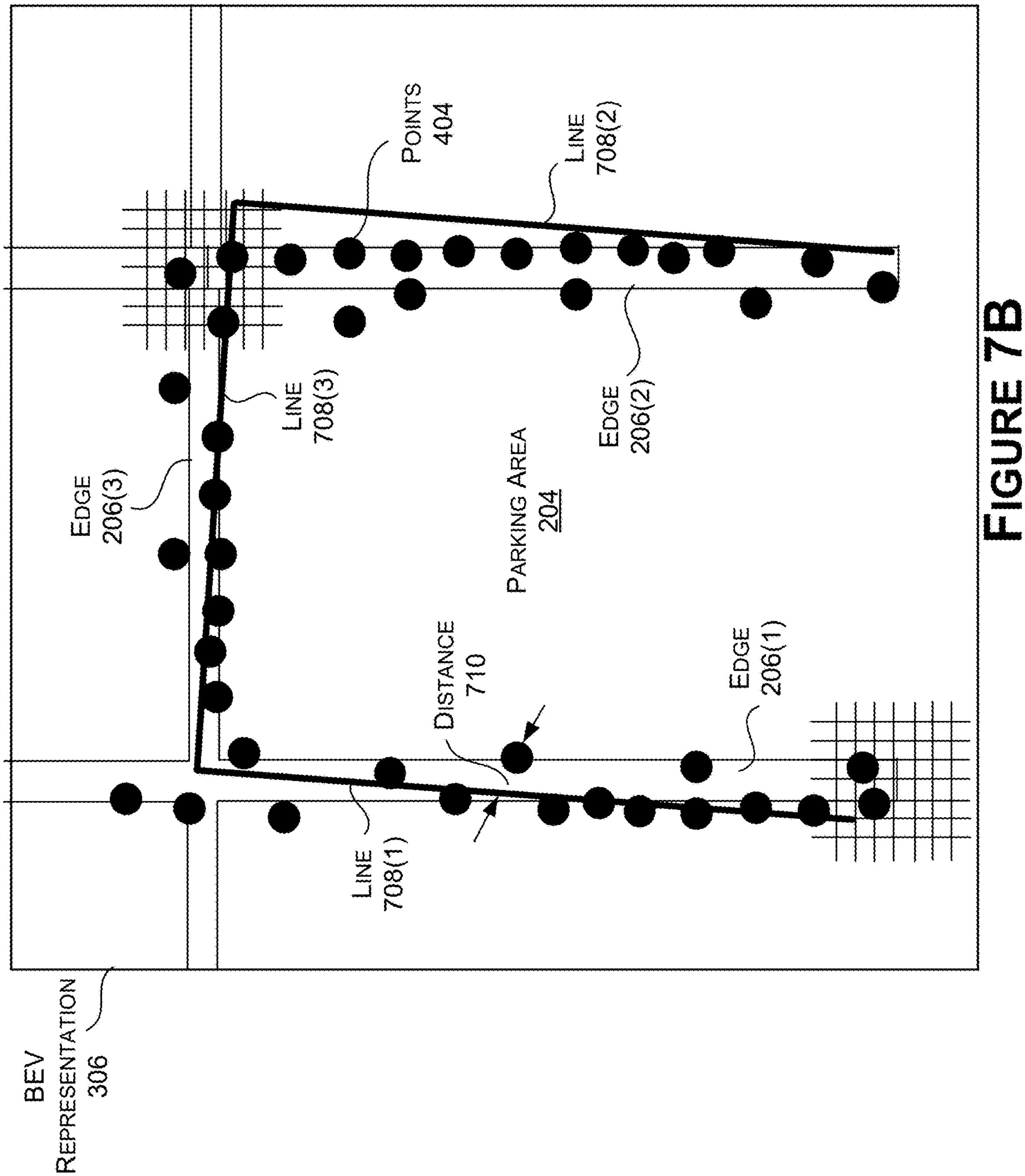
Figure 7C:
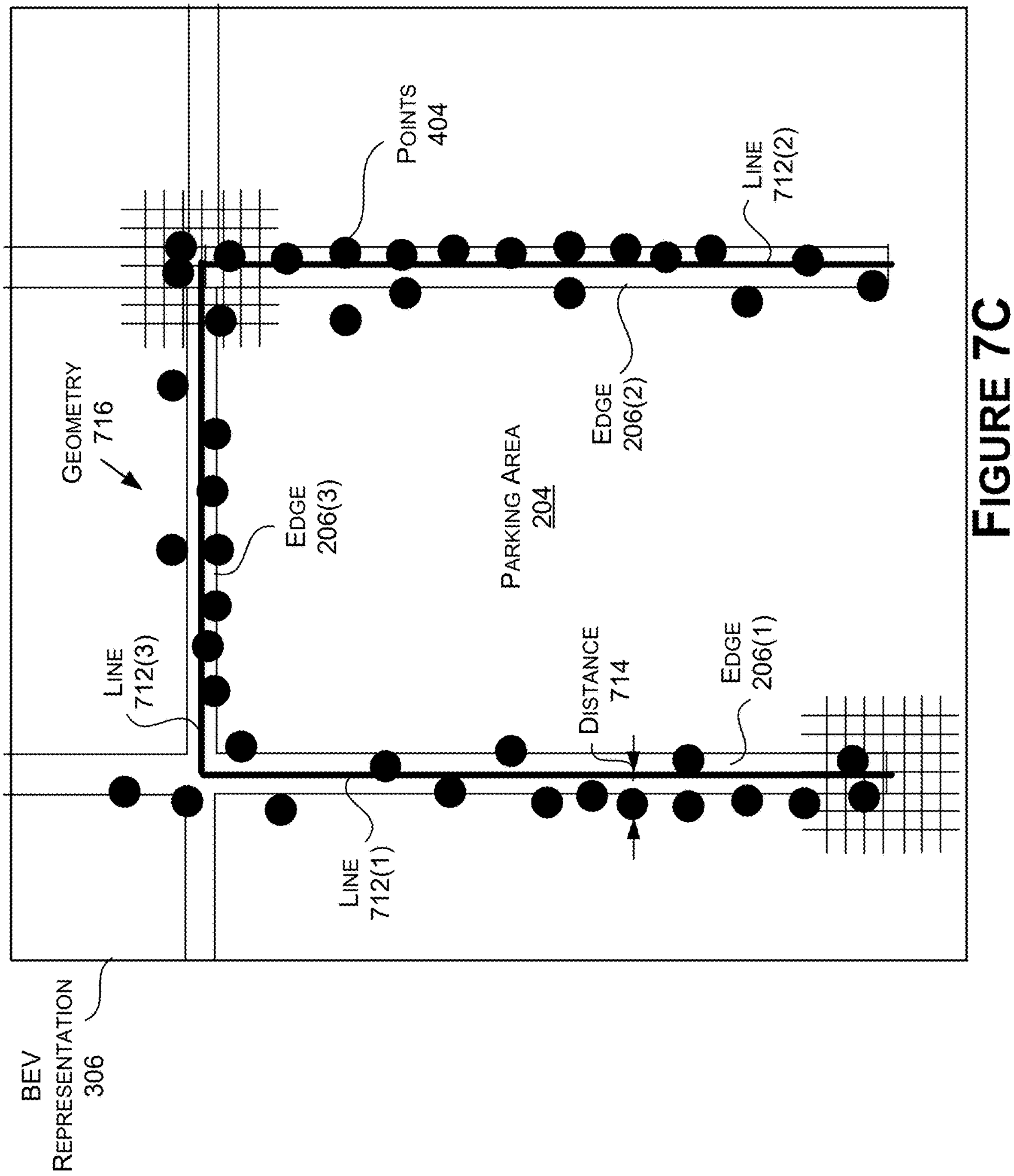

For more detail, FIGS. 7A-7C illustrate an example a first optimization technique to determine an actual geometry associated with the parking area 204, in accordance with some embodiments of the present disclosure. As illustrated by the example of FIG. 7A, the optimization component(s) 116 may determine at least a first 3D point 702(1) associated with a first corner of the parking area 204 and a second 3D point 702(2) associated with a second corner of the parking area 204. In some examples, the optimization component(s) 116 may determine the 3D points 702(1)-(2) using various techniques, such as based on corners of the predicted geometry 308 associated with the parking area 204. The optimization component(s) 116 may also determine an orientation associated with the parking area 204, where the orientation may be represented by the coordinate system. Again, in some examples, the optimization component(s) 116 may determine the orientation using various techniques, such as based on the orientation of the predicted geometry 308 associated with the parking area 204.

The optimization component(s) 116 may also determine parameters associated with performing the optimization. For instance, in some examples, the optimization component(s) 116 may determine parameters that are associated with two degrees of freedom corresponding to movements of the points 702(1)-(2) within the x-coordinate direction and the y-coordinate direction, which is represented by parameters 704(1)-(2), and one degree of freedom corresponding to a rotation associated with a yaw, which is represented by parameter 706. Additionally, there may be ranges for each degree of freedom, such as a first range for the x-coordinate direction that includes moving a point 702(1)-(2) a number of distances (e.g., 5) in a first direction and a number of distances (e.g., 5 in a second direction) in a second direction, a second range for the y-coordinate direction that includes moving a point 702(1)-(2) a number of distances (e.g., 5) in a third direction and a number of distances (e.g., 5) in a fourth direction, and a range for the yaw angle that includes rotating the yaw a number of angles (e.g., 5) in a first rotational direction and a second number of angles (e.g., 5) in a second rotational direction (as indicated by the dashed lines). The optimization component(s) 116 may then use the parameters to determine the actual geometry associated with the parking area 204.

For instance, and as illustrated by the example of FIG. 7B, the optimization component(s) 116 may determine a first set of lines 708(1)-(8) (also referred to singularly as "line 708" or in plural as "lines 708") that may represent the actual geometry using the degrees of freedom. For example, the optimization component(s) 116 may determine the first set of lines 708 using first values associated with the degrees of freedom. The optimization component(s) 116 may then determine a first cost associated with the first set of lines 708, such as based on distances 710 (although only one is labeled for clarity reasons) between the subset of the 3D points 404 and the lines 708. The optimization component(s) 116 may then perform similar processes to determine one or more additional costs associated with or more additional sets of lines using the parameters.

For instance, and as illustrated by the example of FIG. 7C, the optimization component(s) 116 may determine a second set of lines 712(1)-(3) (also referred to singularly as "line 712" or in plural as "lines 712") that may represent the actual geometry using the degrees of freedom. For example, the optimization component(s) 116 may determine the second set of lines 708 using second values associated with the degrees of freedom. The optimization component(s) 116 may then determine a second cost associated with the second set of lines 712, such as based on distances 714 (although only one is labeled for clarity reasons) between the subset of the 3D points 404 and the lines 712. The optimization component(s) 116 may then use the costs associated with the various sets of lines to determine a final set of lines that represents an actual geometry 716 associated with the parking area 204. For instance, and in the examples of FIGS. 7A-7C, the optimization component(s) 116 may determine that the second set of lines 712 represents the actual geometry 716 based at least on the second cost including a lowest cost associated with the sets of lines.

While the example of FIGS. 7A-7C illustrates determining the actual geometry 716 in the world-view environment, in other examples, similar processes may be performed using the 2D image.

Referring back to the example of FIG. 1, in some examples, the process 100 may include performing one or more additional and/or alternative optimization techniques to determine the actual geometry. For instance, such as when multiple images generated using different cameras represent the parking area, the filtering component(s) 112 may use the respective geometry data 106 and/or the respective filtered features associated with each image to determine possible geometries associated with the parking area as represented by each image. The optimization component(s) 116 may then use the possible geometries associated with the images to determine the actual geometry. For example, the optimization component(s) 116 may perform one or more techniques that merge the possible geometries to determine the actual geometry associated with the parking area.

Figure 8A:
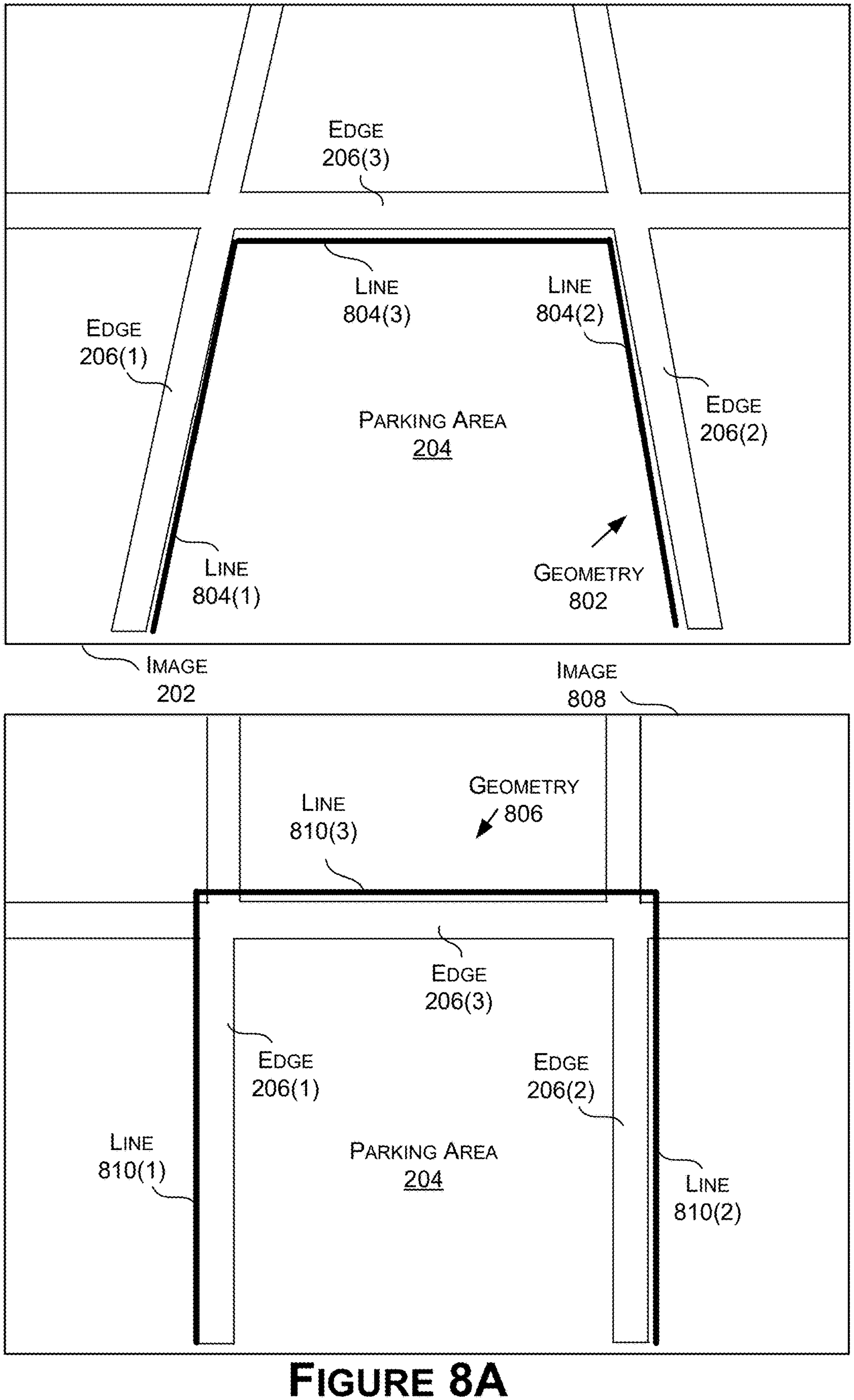
FIGS. 8A-8C illustrate an example of a second optimization technique to determine an actual geometry associated with a parking area, in accordance with some embodiments of the present disclosure.
Figure 8B:
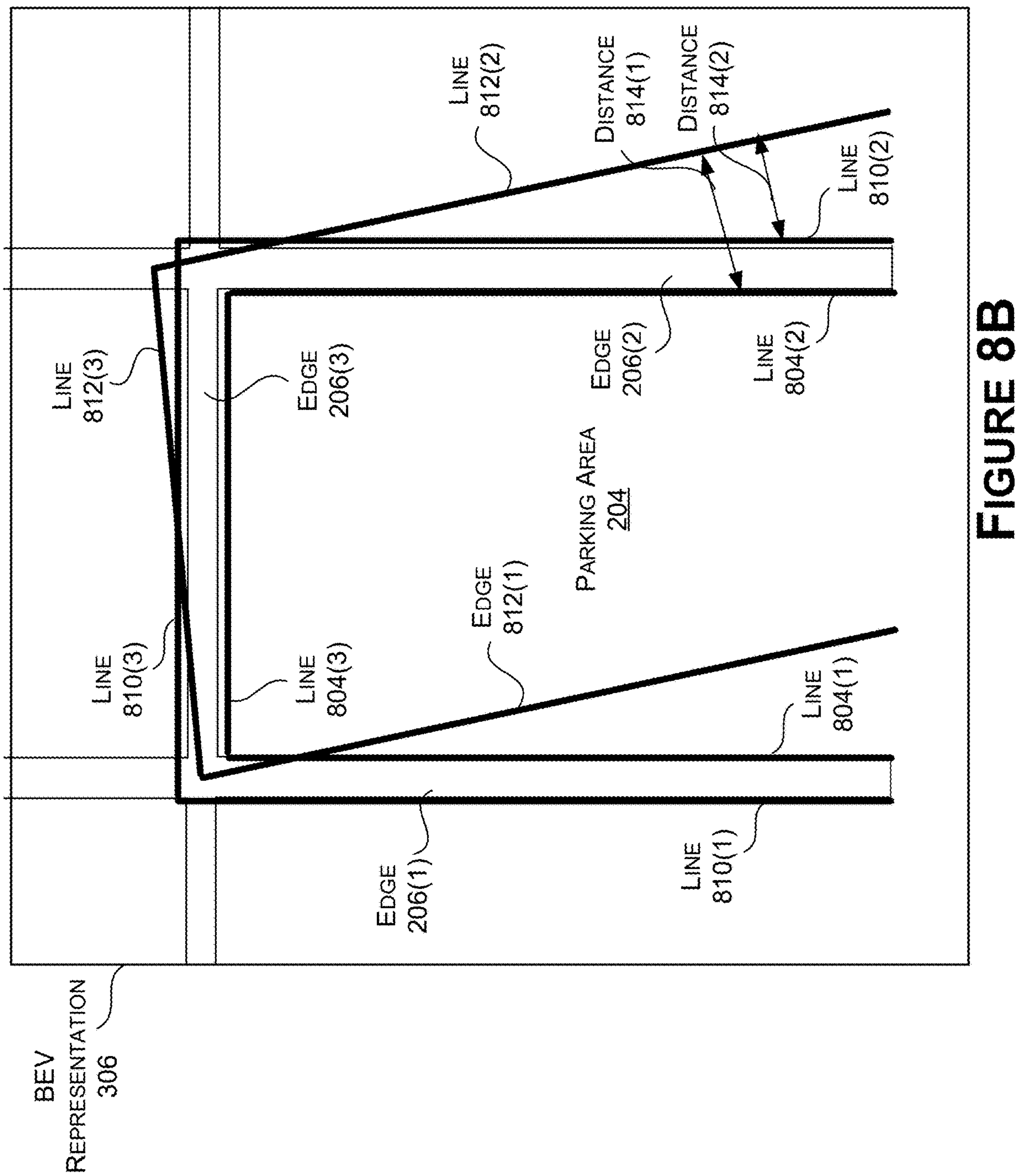
Figure 8C:
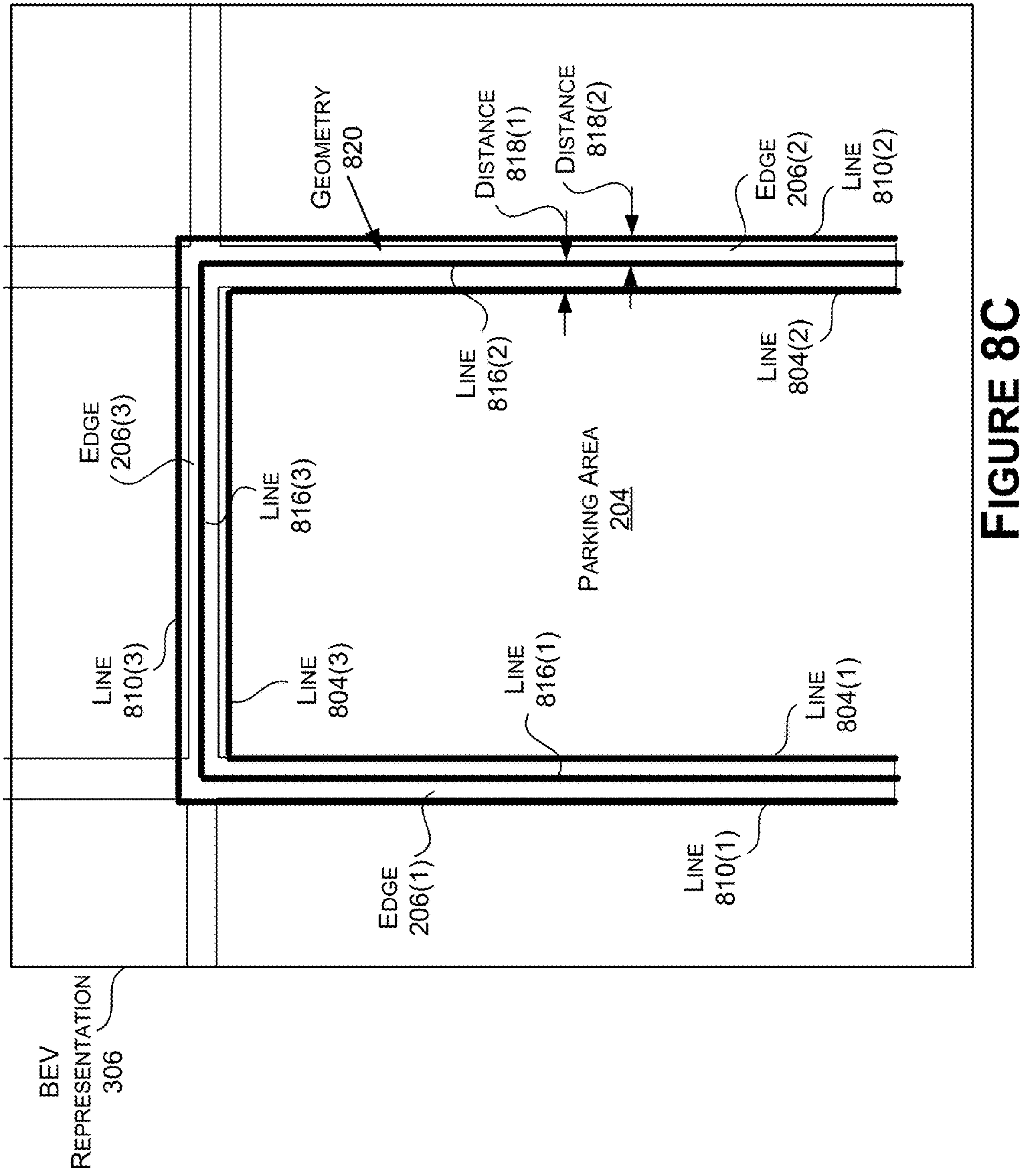

For more details, FIGS. 8A-8C illustrate an example of a second optimization technique to determine an actual geometry associated with the parking area 204, in accordance with some embodiments of the present disclosure. As illustrated by the example of FIG. 8A, the filtering component(s) 112 may use the predicted geometry, the 2D points 402, the set of the 2D points 402, and/or the subset of the 2D points 402 to determine a first geometry 802 for the parking area 204 as represented by the image 202, where the first geometry 802 includes a first set of lines 804(1)-(3) (also referred to singularly as "line 804" or in plural as "lines 804"). Additionally, the filtering component(s) 112 may use the predicted geometry, the 2D points, the set of 2D points, and/or the subset of 2D points to determine a second geometry 806 for the parking area 204 as represented by an additional image 808, where the second geometry 806 includes a second set of lines 810 (also referred to singularly as "line 810" or in plural as "lines 810"). In some examples, the filtering component(s) 112 may use any technique to determine the geometries 802 and 806, such as one or more line fitting techniques (and/or any other technique).

Next, and as illustrated by the example of FIG. 8B, the optimization component(s) 116 may determine a first set of lines 812(1)-(3) (also referred to singularly as "line 812" or in plural as "lines 812") that may represent the actual geometry associated with the parking area 204. The optimization component(s) 116 may then determine a first cost associated with the first set of lines 812, such as based on distances 814(1) (although only one is labeled for clarity reasons) between the lines 812 and the lines 804 and distances 814(2) (although only one is labeled for clarity reasons) between the lines 812 and the lines 810. The optimization component(s) 116 may then perform similar processes to determine one or more additional costs associated with or more additional sets of lines.

For instance, and as illustrated by the example of FIG. 8C, the optimization component(s) 116 may determine a second set of lines 816(1)-(3) (also referred to singularly as "line 816" or in plural as "lines 816") that may represent the actual geometry associated with the parking area 204. The optimization component(s) 116 may then determine a second cost associated with the second set of lines 816, such as based on distances 818(1) (although only one is labeled for clarity reasons) between the lines 816 and the lines 804 and distances 818(2) (although only one is labeled for clarity reasons) between the lines 816 and the lines 810. The optimization component(s) 116 may then use the costs associated with the various sets of lines to determine a final set of lines that represents an actual geometry 820 associated with the parking area 204. For instance, and in the examples of FIGS. 8A-8C, the optimization component(s) 116 may determine that the second set of lines 816 represents the actual geometry 820 based at least on the second cost including a lowest cost associated with the sets of lines.

While the example of FIGS. 8A-8C illustrates determining the actual geometry 820 in the world-view environment, in other examples, similar processes may be performed using the 2D image.

Referring back to the example of FIG. 1, the process 100 may include the optimization component(s) 116 generating and/or outputting optimized geometry data 118 representing the actual geometry associated with the parking area. In some examples, the process 100 may then continue to repeat at different time intervals, such as every 10 milliseconds (and/or any other time interval), and/or at different frame rates, such as every frame (and/or any other frame rate). Additionally, in some examples, the process 100 may include one or more processing components 120 performing one or more processes using the optimized geometry data 118.

For a first example, since the optimized geometry data 118 may represent actual geometries associated with the parking area determined at different processing instances, the processing component(s) 120 may perform one or more smoothing operations to determine a final geometry associated with the parking area. For a second example, the processing component(s) 120 may use the optimized geometry data 118 and/or the final geometry to determine one or more operations for a machine to navigate. For instance, the processing component(s) 120 may determine one or more trajectories for the machine to navigate based at least on the final geometry associated with the parking area, such as a trajectory to park the machine within the parking area.

Figure 9:
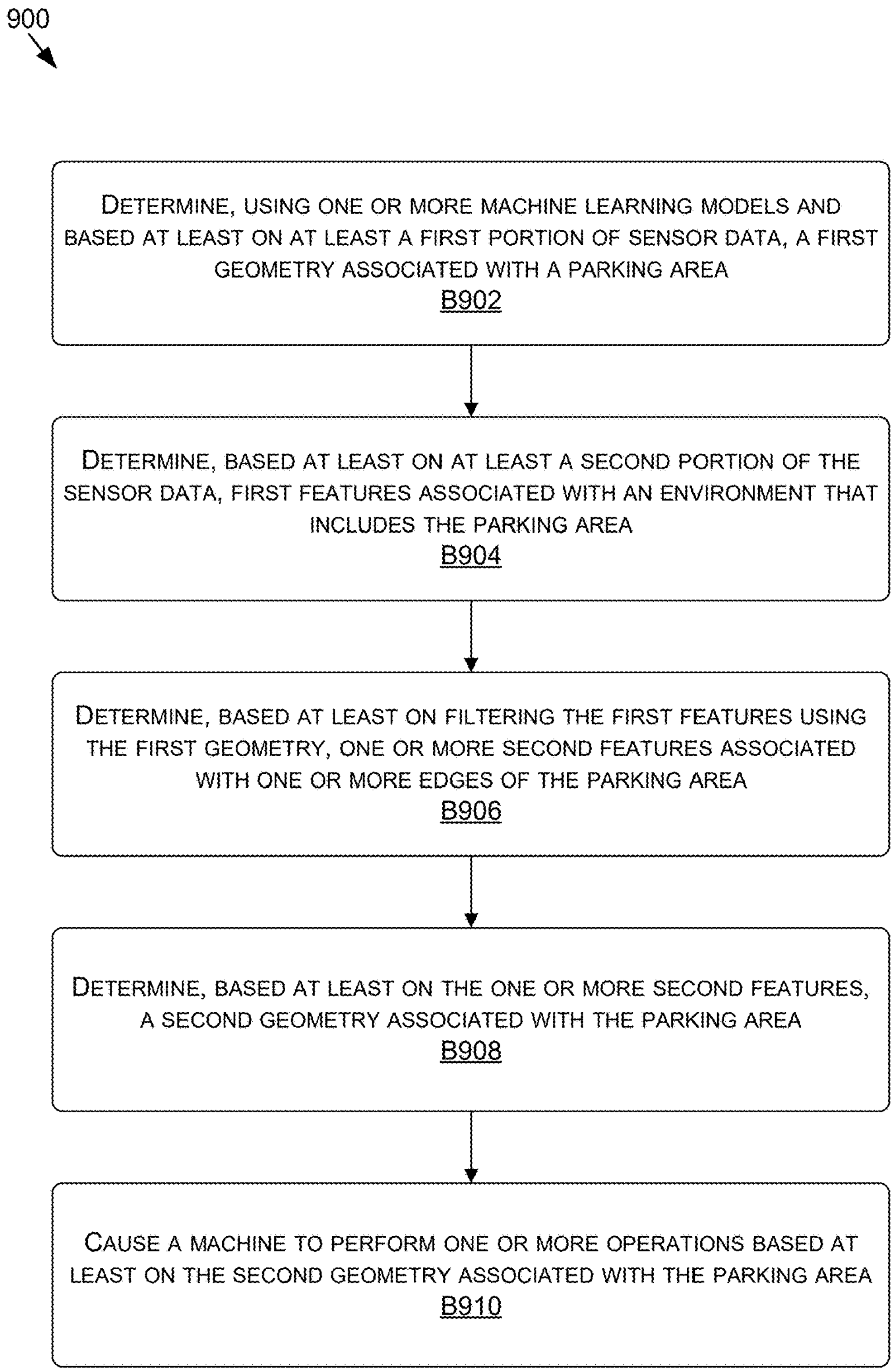
FIG. 9 illustrates a flow diagram showing a method for detecting parking areas within an environment, in accordance with some embodiments of the present disclosure.
Figure 11:
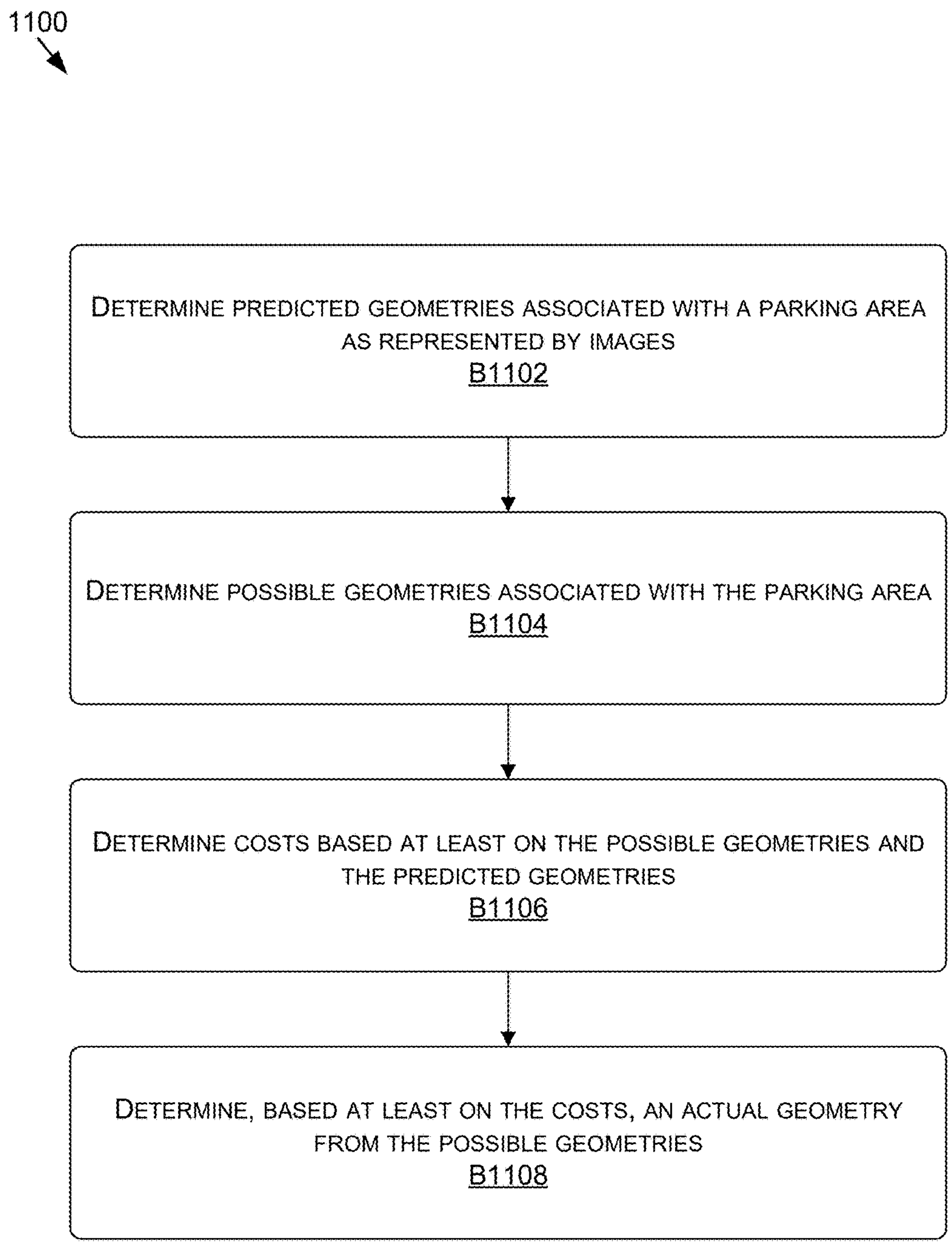
FIG. 11 illustrates a flow diagram showing a method for detecting parking areas within an environment using predictions from multiple images, in accordance with some embodiments of the present disclosure.

Now referring to FIGS. 9-11, each block of method 900, 1000, and 1100, described herein, comprises a computing process that may be performed using any combination of hardware, firmware, and/or software. For instance, various functions may be carried out by a processor executing instructions stored in memory. The methods 900, 1000, and 1100 may also be embodied as computer-usable instructions stored on computer storage media. The methods 900, 1000, and 1100 may be provided by a standalone application, a service or hosted service (standalone or in combination with another hosted service), or a plug-in to another product, to name a few. In addition, these methods 900, 1000, and 1100 described, by way of example, with respect to FIG. 1. However, these methods 900, 1000, and 1100 may additionally or alternatively be executed by any one system, or any combination of systems, including, but not limited to, those described herein.

FIG. 9 illustrates a flow diagram showing a method 900 for detecting parking areas within an environment, in accordance with some embodiments of the present disclosure. The method 900, at block B902, may include determining, using one or more machine learning models and based at least on at least a first portion of sensor data, a first geometry associated with a parking area. For instance, the model(s) 104 may process at least a first portion of the sensor data 102 to generate the geometry data 106 representing the predicted geometry (e.g., the first geometry) associated with the parking area. As described herein, the predicted geometry may represent a location, a shape, dimensions, and/or an orientation associated with the parking area. For example, the predicted geometry may indicate at least one or more locations of one or more edges of the parking area, such as the left edge, the right edge, the front edge, and/or the back edge of the parking area.

The method 900, at block B904, may include determining, based at least on at least a second portion of the sensor data, first features associated with an environment that includes the parking area. For instance, the edge detection component(s) 108 may process at least a second portion of the sensor data 102 to generate the feature data 110 representing the features associated with the environment. As described herein, in some examples, the features may represent 2D points associated with one or more images, 3D points associated with the environment, 2D lines associated with the image(s), and/or 3D lines associated with the environment. Additionally, in some examples, the edge detection component(s) 108 may include and/or use one or more algorithms, one or more machine learning models, one or more modules, one or more applications, and/or any other type of processing component to perform edge detection to determine the features.

The method 900, at block B906, may include determining, based at least on filtering the first features using the first geometry, one or more second features associated with one or more edges of the parking area. For instance, the filtering component(s) 112 may use at least the geometry data 106 and the feature data 110 to filter the features. As described herein, in some examples, the filtering component(s) 112 may filter the features by removing one or more features, from the features, that are outside of a threshold distance to the predicted geometry to determine a set of features. Additionally, in some examples, the filtering component(s) 112 may further filter the features by determining one or more lines using the set of features and then removing one or more additional features, from the set of features, that are outside of an additional threshold distance to determine a subset of features. In any of the examples, the filtering component(s) 112 may output the filtered feature data 114 representing the filtered features (e.g., the one or more second features).

The method 900, at block B908, may include determining, based at least on the one or more second features, a second geometry associated with the parking area. For instance, the optimization component(s) 116 may use the filtered features to determine the actual geometry (e.g., the second geometry) associated with the parking area. As described herein, in some examples, the optimization component(s) 116 may use a first technique that determines the actual geometry using one or more features determined using the predicted geometry, an orientation, the filtered features, and/or one or more parameters, with is described at least with respect to FIG. 10. Additionally, or alternatively, in some examples, the optimization component(s) 116 may use a second technique that determines the actual geometry using possible geometries associated with multiple images, which is described at least with respect to FIG. 11.

The method 900, at block B910, may include causing a machine to perform one or more operations based at least on the second geometry associated with the parking area. For instance, the processing component(s) 120 may cause the machine to perform the operation(s) based at least on the actual geometry. As described herein, in some examples, the operation(s) may include causing the machine to navigate one or more paths, such as a path that causes the machine to park within the parking area.

FIG. 10 illustrates a flow diagram showing a method 1000 for detecting parking areas within an environment using configuration parameters, in accordance with some embodiments of the present disclosure. The method 1000, at block B1002, may include determining, based at least on a predicted geometry associated with a parking area, one or more first points. For instance, the optimization component(s) 116 may determine the first point(s) associated with the parking area using the predicted geometry represented by the geometry data 106. As described herein, in some examples, the first point(s) may include at least two points located on opposite corners of the predicted geometry.

The method 1000, at block B1004, may include determining parameters associated with the one or more first points and an orientation associated with the parking area. For instance, the optimization component(s) 116 may determine the parameters associated with the first point(s) and the orientation associated with the parking area. As described herein, in some examples, the parameters may correspond to at least two degrees of freedom associated with the first point(s) and one degree of freedom associated with the orientation. As such, in some examples, such as when the first point(s) include two points on opposite corners of the predicted geometry, the parameters may correspond to five degrees of freedom.

The method 1000, at block B1006, may include determining, based at least on the parameters, sets of lines corresponding to geometries associated with the parking area. For instance, the optimization component(s) 116 may determine the sets of lines corresponding to the geometries using at least the parameters. For instance, in some examples, the optimization component(s) 116 may determine the sets of lines using various values for the degrees of freedom associated with the parameters.

The method 1000, at block B1008, may include determining, based at least on second points associated with the parking area, costs associated with the geometries. For instance, the optimization component(s) 116 may determine the costs associated with the geometries using at least the second points (e.g., the features) represented by the filtered feature data 114. As described herein, in some examples, the optimization component(s) 116 may determine the costs based at least on distances between the lines included in the sets of lines and the second points. For example, the optimization component(s) 116 may determine lower costs as the distances between the lines and the second points decreases. In other words, the optimization component(s) may determine lower costs for geometries that are close to the actual geometry associated with the parking area.

The method 1000, at block B1010, may include determining based at least on the costs, an actual geometry of the geometries. For instance, the optimization component(s) 116 may determine the actual geometry associated with the parking area using at least the costs. As described herein, in some examples, the optimization component(s) 116 may determine the actual geometry as including the geometry that is associated with the lowest cost from among the costs.

FIG. 11 illustrates a flow diagram showing a method 1100 for detecting parking areas within an environment using predictions from multiple images, in accordance with some embodiments of the present disclosure. The method 1100, at block B1102, may include determining predicted geometries associated with a parking area as represented by images. For instance, the optimization component(s) 116 may determine at least a respective predicted geometry associated with each image represented by the sensor data 102. As described herein, in some examples, the optimization component(s) 116 may determine a predicted geometry associated with an image using the geometry data 106 representing the predicted geometry and/or the features, the set of features, and/or the subset of features as represented by the filtered feature data 114.

The method 1100, at block B1104, may include determining possible geometries associated with the parking area. For instance, the optimization component(s) 116 may determine the possible geometries associated with the parking area. As described herein, in some examples, the optimization component(s) 116 may determine the possible geometries using at least the predicted geometries, such as by performing one or more line fitting techniques. Additionally, a possible geometry may include at least one or more lines indicating one or more locations of one or more edges of the parking area and/or an orientation associated with the parking area.

The method 1100, at block B1106, may include determining costs based at least on the possible geometries and the predicted geometries. For instance, the optimization component(s) 116 may determine the costs based at least on comparing the possible geometries to the predicted geometries. As described herein, in some examples, and for a possible geometry, the optimization component(s) 116 may determine the cost based at least on distances between lines associated with the possible geometry and lines associated with the predicted geometries. In other words, the optimization component(s) 116 may determine lower costs for possible geometries that are close to the actual geometry associated with the parking area.

The method 1100, at block B1108, may include determining, based at least on the costs, an actual geometry of the possible geometries. For instance, the optimization component(s) 116 may determine the actual geometry associated with the parking area using at least the costs. As described herein, in some examples, the optimization component(s) 116 may determine the actual geometry as including the geometry that is associated with the lowest cost from among the costs.

Example Autonomous Vehicle

Figure 12A:
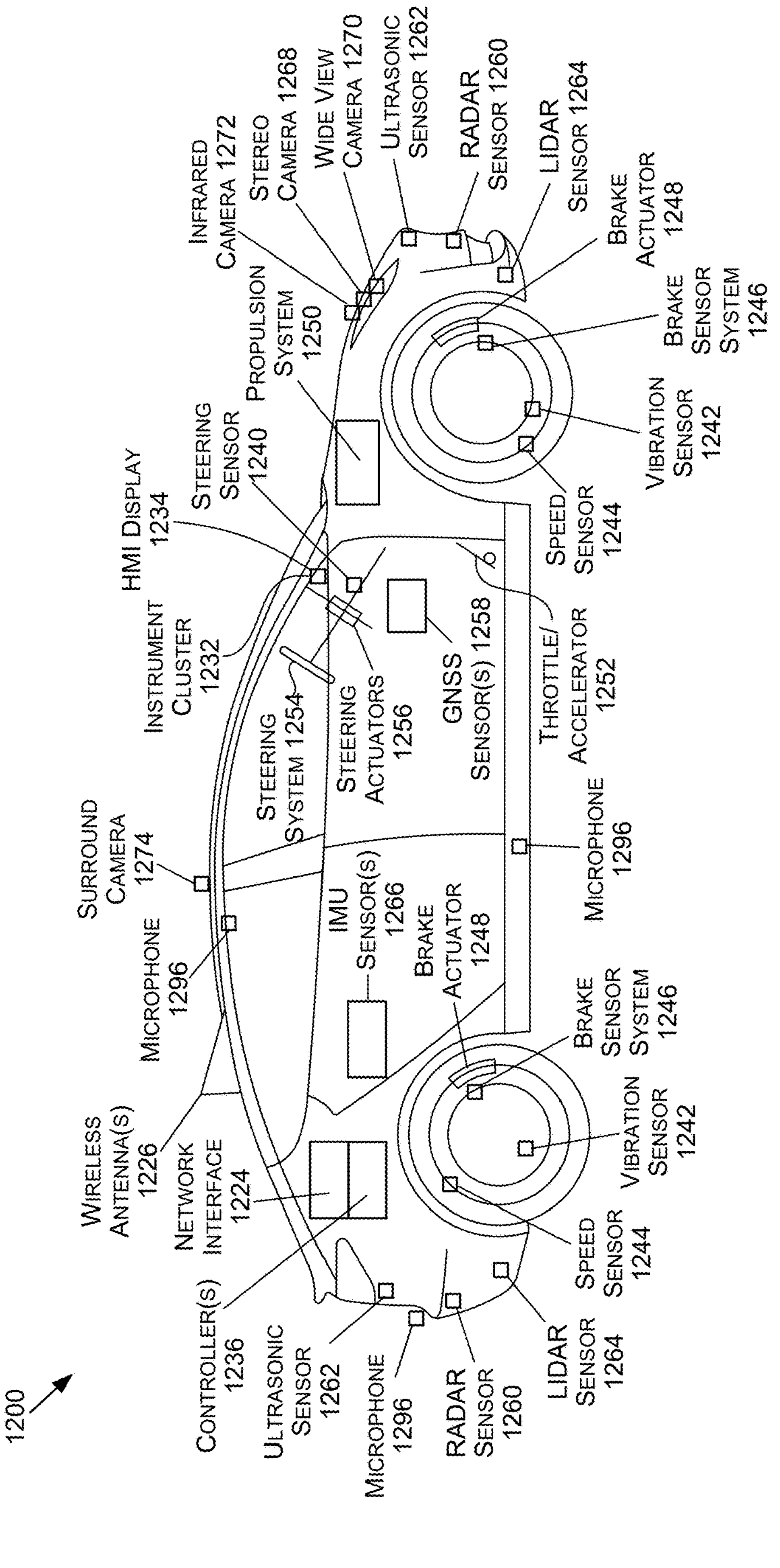
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. The vehicle 1200 may be capable of functionality in accordance with one or more of Level 1-Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 12B:
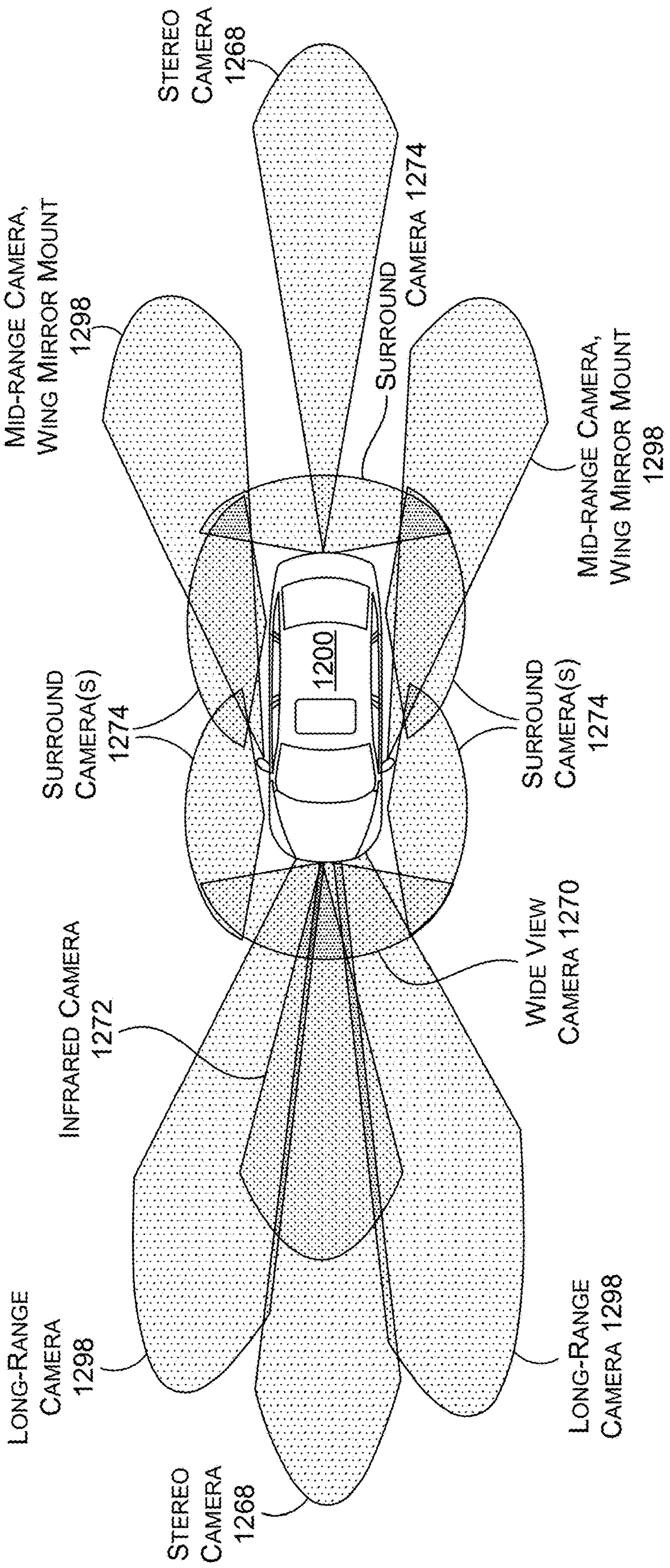
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor (s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Figure 12C:
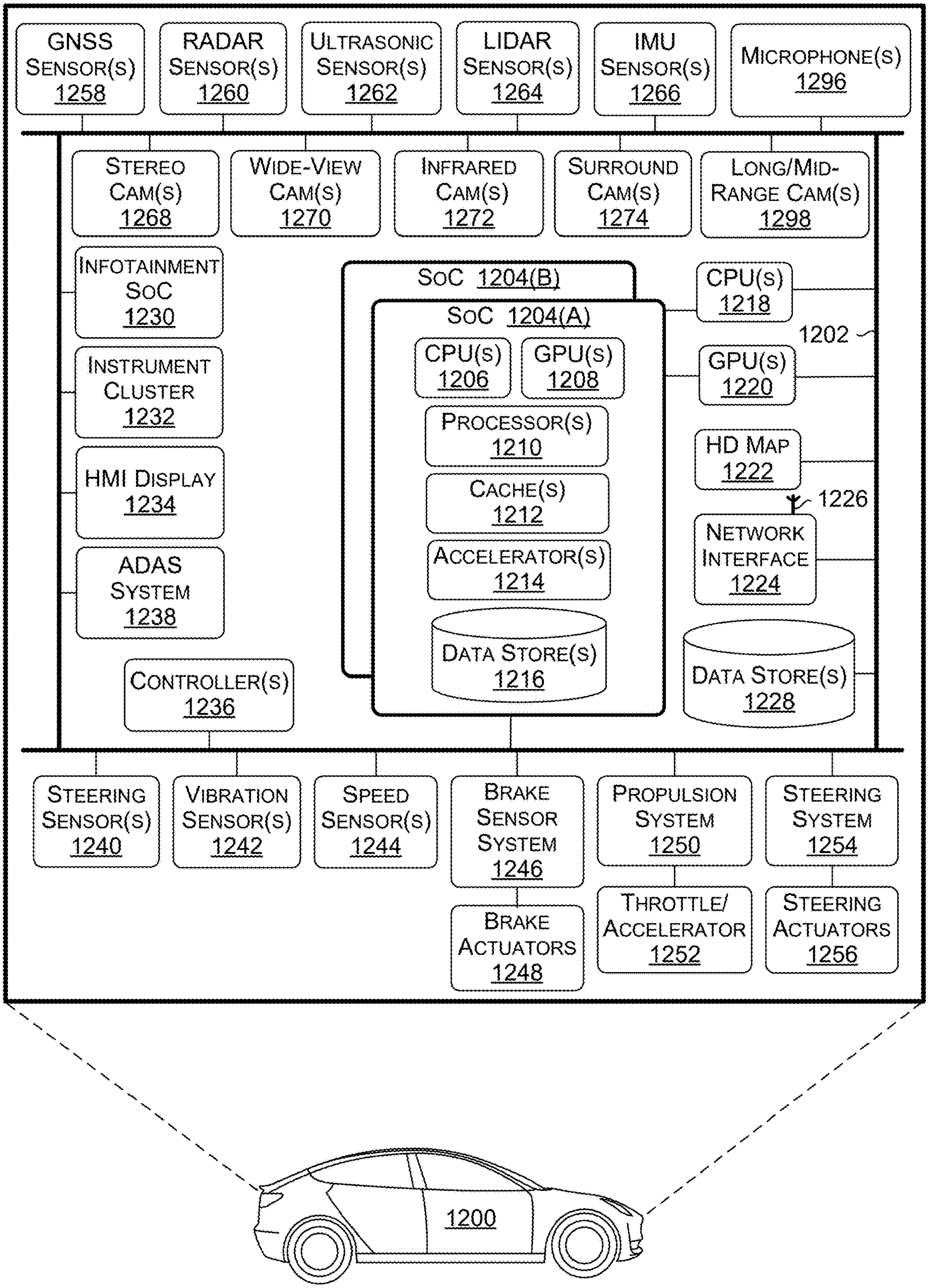
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 1200), while the 12V communication concept provides information about traffic further ahead. CACC systems may include either or both 12V and V2V information sources. Given the information of the vehicles ahead of the vehicle

1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
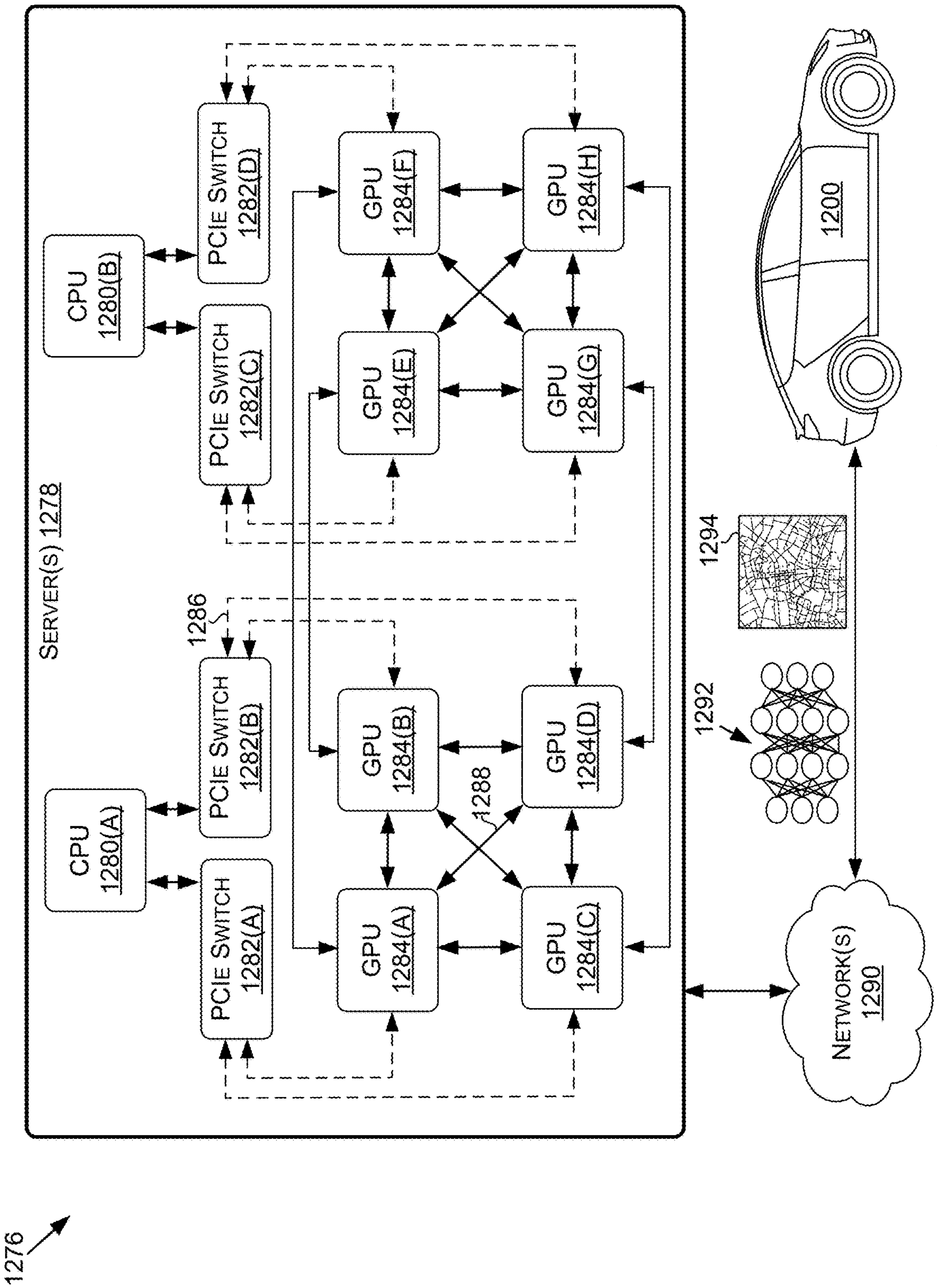
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284 (H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
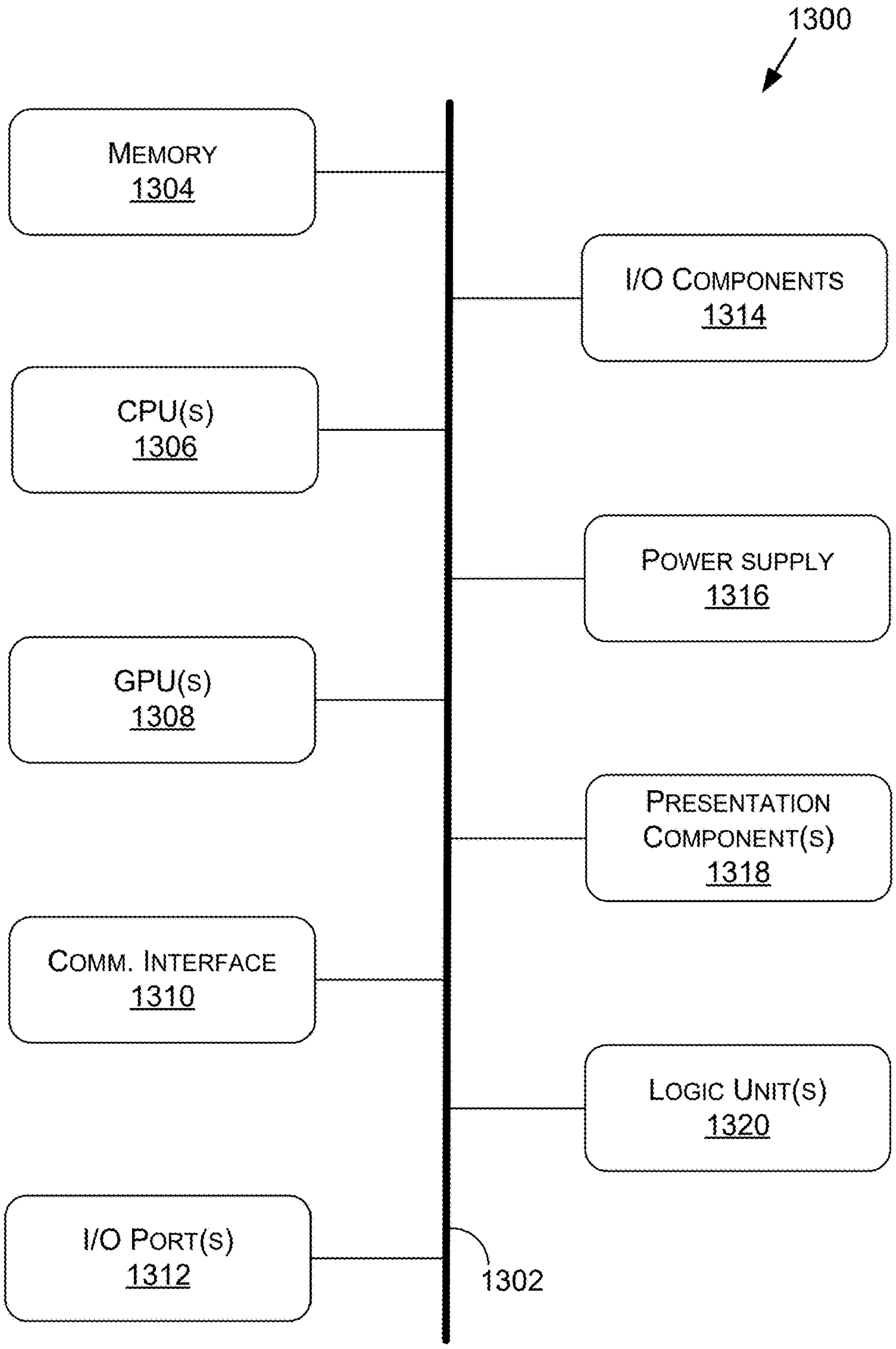
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
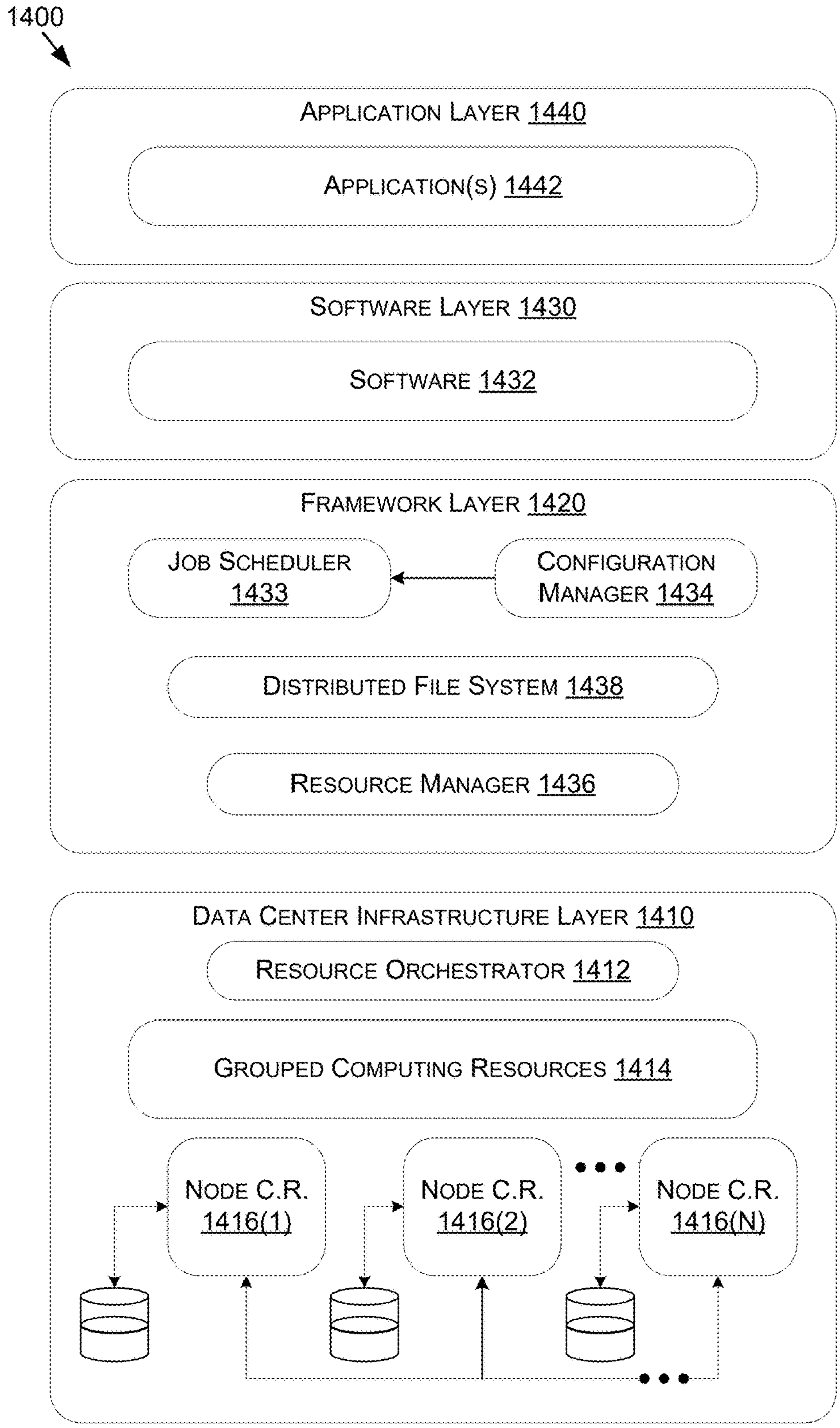
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., “big data”).

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of “and/or” with respect to two or more elements should be interpreted to mean only one element, or a combination of elements. For example, “element A, element B, and/or element C” may include only element A, only element B, only element C, element A and element B, element A and element C, element B and element C, or elements A, B, and C. In addition, “at least one of element A or element B” may include at least one of element A, at least one of element B, or at least one of element A and at least one of element B. Further, “at least one of element A and element B” may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Example Paragraphs

A: A method comprising: determining, using one or more machine learning models and based at least on first sensor data, a first geometry associated with a parking area; determining, based at least on second sensor data, first features associated with an environment that includes the parking area; determining, based at least on filtering at least a portion of the first features using the first geometry, one or more second features associated with one or more edges of the parking area; determining, based at least on the one or more second features, a second geometry associated with the parking area; and causing a machine to perform one or more operations based at least on the second geometry associated with the parking area.

B: The method of paragraph A, wherein: the first features include pixels of one or more images represented by the second sensor data; and the determining the one or more second features comprises determining, based at least on filtering out at least the portion of the pixels that are outside a threshold pixel distance to one or more second edges associated with the first geometry, a second portion of the pixels associated with the one or more edges of the parking area.

C: The method of either paragraph A or paragraph B, wherein: the first features include three-dimensional (3D) points associated with the environment; and the determining the one or more second features comprises determining, based at least on filtering out at least the portion of the 3D points that are outside a threshold distance to one or more second edges associated with the first geometry, a second portion of the 3D points that are associated with the one or more edges of the parking area.

D: The method of any one of paragraphs A-C, further comprising: determining, based at least on the one or more second features, one or more lines that represent the one or more edges of the parking area; and determining, based at least on filtering the one or more second features using the one or more lines, one or more third features associated with the one or more edges of the parking area, wherein the determining the second geometry associated with the parking area is based at least on the one or more third features.

E: The method of paragraph D, wherein the one or more second features include points, and the determining the one or more third features comprises determining, based at least on filtering out at least a first portion of the points that are outside of a threshold distance to the one or more lines, a second portion of the points associated with the one or more edges of the parking area.

F: The method of any one of paragraphs A-E, wherein: the one or more second features include one or more first points; and the determining the second geometry associated with the parking area comprises: determining, based at least on the first geometry associated with the parking area, one or more second points; determining one or more lines corresponding to the one or more edges based at least on the one or more first points and the one or more second points; and determining the second geometry associated with the parking area based at least on the one or more lines.

G: The method of paragraph F, wherein the determining the one or more lines corresponding to the one or more edges uses one or more optimization parameters, the one or more optimization parameters including at least one of: one or more first locations of the one or more second points in a first coordinate direction; one or more second locations of the one or more second points in a second coordinate direction; or one or more yaw angles associated with the parking area.

H: The method of any one of paragraphs A-G, wherein: the one or more second features comprise one or more first lines corresponding to the one or more edges as represented by a first image and one or more second lines corresponding to the one or more edges as represented by a second image; and the determining the second geometry associated with the parking area comprises: determining one or more third lines corresponding the one or more edges based at least on the one or more first lines and the one or more second lines; and determining the second geometry associated with the parking area based at least on the one or more third lines.

I: The method of paragraph H, wherein the determining the one or more third lines corresponding to the one or more edges comprises determining the one or more third lines based at least one or more first distances between the one or more third lines and the one or more first lines and one or more second distances between the one or more third lines and the one or more second lines.

J: A system comprising: one or more processors to: determine, using one or more neural networks and based at least on at least a first portion of sensor data, a first geometry associated with a parking area; determine, based at least on at least a second portion of the sensor data, one or more features corresponding to one or more edges associated with an environment that includes the parking area; determine, based at least on the first geometry and the one or more features, a second geometry associated with the parking area; and cause a machine to perform one or more operations based at least on the second geometry associated with the parking area.

K: The system of paragraph J, wherein the one or more processors are further to: determine, based at least on filtering the one or more features using the first geometry, one or more second features corresponding to one or more second edges associated with the parking area, wherein the determination of the second geometry is based at least on the one or more second features.

L: The system of paragraph K, wherein: the one or more features include pixels of one or more images represented by the sensor data; and the determination of the one or more second features comprises determining, based at least on filtering out at least a first portion of the pixels that are outside a threshold pixel distance to one or more lines associated with the first geometry, a second portion of the pixels that correspond to the one or more second edges associated with the parking area.

M: The system of paragraph K, wherein: the one or more features include three-dimensional (3D) points associated with the environment; and the determination of the one or more second features comprises determining, based at least on filtering out at least a first portion of the 3D points that are outside a threshold distance to one or more lines associated with the first geometry, a second portion of the 3D points that correspond to the one or more second edges associated with the parking area.

N: The system of any one of paragraphs J-M, wherein the one or more processors are further to: determine, based at least on the one or more features, one or more lines that represent one or more second edges associated with the parking area; and determine, based at least on filtering the one or more features using the one or more lines, one or more second features corresponding to the one or more second edges associated with the parking area, wherein the determination of the second geometry associated with the parking area is based at least on the one or more second features.

O: The system of any one of paragraphs J-N, wherein: the one or more features include one or more first points; and the determination of the second geometry associated with the parking area comprises: determining, based at least on the first geometry associated with the parking area, one or more second points; determining, based at least on the one or more first points and the one or more second points, one or more lines corresponding to one or more second edges associated with the parking area; and determining the second geometry associated with the parking area based at least on the one or more lines.

P: The system of paragraph O, wherein the determination of the one or more lines corresponding to the one or more second edges uses one or more optimization parameters, the one or more optimization parameters including at least one of: one or more first locations of the one or more second points in a first coordinate direction; one or more second locations of the one or more second points in a second coordinate direction; or one or more yaw angles associated with the parking area.

Q: The system of any one of paragraphs J-P, wherein: the one or more second features comprise one or more first lines corresponding to one or more second edges associated with the parking area as represented by a first image and one or more second lines corresponding to the one or more second edges as represented by a second image; and the determination of the second geometry associated with the parking area comprises: determining one or more third lines corresponding the one or more second edges based at least on the one or more first lines and the one or more second lines; and determining the second geometry associated with the parking area based at least on the one or more third lines.

R: The system of any one of paragraphs J-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: One or more processors comprising: processing circuitry to cause a machine to perform one or more operations based at least on a first geometry associated with a parking area, wherein the first geometry is determined based at least a second geometry associated with the parking area as determined using one or more machine learning models and one or more features associated with the parking area as determined using edge detection.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

determining, using one or more machine learning models and based at least on first sensor data, a first geometry associated with a parking area;

determining, based at least on second sensor data, first points associated with an environment that includes the parking area;

determining, based at least on filtering out at least a portion of the first points that are outside of a threshold distance to the first geometry, one or more second points associated with one or more edges of the parking area;

determining, based at least on the one or more second points, a second geometry associated with the parking area; and causing a machine to perform one or more operations based at least on the second geometry associated with the parking area.

2. The method of claim 1, wherein:

the first points include pixels of one or more images represented by the second sensor data;

the threshold distance includes a threshold pixel distance; and the determining the one or more second points comprises determining, based at least on filtering out at least the portion of the pixels that are outside the threshold pixel distance to one or more second edges associated with the first geometry, a second portion of the pixels associated with the one or more edges of the parking area, the one or more second points including the second portion of the pixels.

3. The method of claim 1, wherein:

the first points include three-dimensional (3D) points associated with the environment; and the determining the one or more second points comprises determining, based at least on filtering out at least the portion of the 3D points that are outside the threshold distance to one or more second edges associated with the first geometry, a second portion of the 3D points that are associated with the one or more edges of the parking area, the one or more second points including the portion of the 3D points.

4. The method of claim 1, further comprising:

determining, based at least on the one or more second points, one or more lines that represent the one or more edges of the parking area; and determining, based at least on filtering the one or more second points using the one or more lines, one or more third points associated with the one or more edges of the parking area, wherein the determining the second geometry associated with the parking area is based at least on the one or more third points.

5. The method of claim 4, wherein the filtering the one or more second points is based at least on a second threshold distance to the one or more lines.

6. The method of claim 1, wherein:

the determining the second geometry associated with the parking area comprises:

determining, based at least on the first geometry associated with the parking area, one or more third points;

determining one or more lines corresponding to the one or more edges based at least on the one or more second points and the one or more third points; and determining the second geometry associated with the parking area based at least on the one or more lines.

7. The method of claim 6, wherein the determining the one or more lines corresponding to the one or more edges uses one or more optimization parameters, the one or more optimization parameters including at least one of:

one or more first locations of the one or more third points in a first coordinate direction;

one or more second locations of the one or more third points in a second coordinate direction; or one or more yaw angles associated with the parking area.

8. A system comprising:

one or more processors to:

determine, using one or more neural networks and based on at least a first portion of sensor data, a first geometry associated with a parking area;

determine, based on at least a second portion of the sensor data, first features associated with an environment that includes the parking area;

determine, based at least on filtering out a portion of the first features that are outside of a threshold distance to one or more first edges associated with the first geometry, one or more second features associated with one or more second edges of the parking area;

determine, based at least on the one or more second features, a second geometry associated with the parking area; and cause a machine to perform one or more operations based at least on the second geometry associated with the parking area.

9. The system of claim 8, wherein the second geometry is configured using at least a portion of the one or more second edges.

10. The system of claim 8, wherein:

the first features include pixels of one or more images represented by the sensor data;

the threshold distance includes a threshold pixel distance; and the determination of the one or more second features comprises determining, based at least on filtering out at least a first portion of the pixels that are outside the threshold pixel distance to one or more first edges associated with the first geometry, a second portion of the pixels that correspond to the one or more second edges associated with the parking area, the one or more second features including the second portion of the pixels.

11. The system of claim 8, wherein:

the first features include three-dimensional (3D) points associated with the environment; and the determination of the one or more second features comprises determining, based at least on filtering out at least a first portion of the 3D points that are outside the threshold distance to one or more first edges associated with the first geometry, a second portion of the 3D points that correspond to the one or more second edges associated with the parking area, the one or more second features including the second portion of the 3D points.

12. The system of claim 8, wherein the one or more processors are further to:

determine, based at least on the one or more second features, one or more lines that represent the one or more second edges associated with the parking area; and determine, based at least on filtering the one or more second features using the one or more lines, one or more third features corresponding to the one or more second edges associated with the parking area, wherein the determination of the second geometry associated with the parking area is based at least on the one or more third features.

13. The system of claim 8, wherein:

the one or more second features include one or more first points; and the determination of the second geometry associated with the parking area comprises:

determining, based at least on the first geometry associated with the parking area, one or more second points;

determining, based at least on the one or more first points and the one or more second points, one or more lines corresponding to the one or more second edges associated with the parking area; and determining the second geometry associated with the parking area based at least on the one or more lines.

14. The system of claim 13, wherein the determination of the one or more lines corresponding to the one or more second edges uses one or more optimization parameters, the one or more optimization parameters including at least one of:

one or more first locations of the one or more second points in a first coordinate direction;

one or more second locations of the one or more second points in a second coordinate direction; or one or more yaw angles associated with the parking area.

15. The system of claim 8, wherein:

the one or more second features comprise one or more first lines corresponding to the one or more second edges associated with the parking area as represented by a first image and one or more second lines corresponding to the one or more second edges as represented by a second image; and the determination of the second geometry associated with the parking area comprises:

determining one or more third lines corresponding the one or more second edges based at least on the one or more first lines and the one or more second lines; and determining the second geometry associated with the parking area based at least on the one or more third lines.

16. The system of claim 8, wherein the system is comprised in at least one of:

a control system for an autonomous or semi-autonomous machine;

a perception system for an autonomous or semi-autonomous machine;

a system for performing one or more simulation operations;
a system for performing one or more digital twin operations;
a system for performing light transport simulation;
a system for performing collaborative content creation for 3D assets;
a system that provides one or more cloud gaming applications;
a system for performing one or more deep learning operations;
a system implemented using an edge device;
a system implemented using a robot;
a system for performing one or more generative AI operations;
a system for performing operations using one or more large language models (LLMs);
a system for performing operations using one or more vision language models (VLMs);
a system for performing operations using one or more multi-modal language models;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

17. One or more processors comprising:
processing circuitry to cause a machine to perform one or more operations based at least on a first geometry associated with a parking area, wherein the first geometry is determined based at least a second geometry associated with the parking area as determined using one or more machine learning models and a first portion of features associated with one or more edges of the parking area as determined based at least on filtering out a second portion of the features that are outside of a threshold distance to first geometry.

18. The one or more processors of claim 17, wherein the one or more processors are comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system that provides one or more cloud gaming applications;
a system for performing one or more deep learning operations;
a system implemented using an edge device;
a system implemented using a robot;
a system for performing one or more generative AI operations;
a system for performing operations using one or more large language models (LLMs);
a system for performing operations using one or more vision language models (VLMs);
a system for performing operations using one or more multi-modal language models;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

19. The one or more processors of claim 17, wherein the filtering out the second portion of the features is based at least on the second portion of the features being outside of threshold distance to one or more second edges associated with the first geometry.

20. The one or more processors of claim 17, wherein:
the second portion of the features includes one or more points; and
the processing circuitry is further to determine the first geometry associated with the parking area based at least on optimizing the one or more edges of the parking area using the one or more points.

* * * * *